(12) United States Patent
Bollas et al.

(10) Patent No.: US 12,370,520 B2
(45) Date of Patent: Jul. 29, 2025

(54) SCHEDULING OF SEMI-BATCH CHEMICAL-LOOPING REACTORS

(71) Applicant: University of Connecticut, Farmington, CT (US)

(72) Inventors: George M. Bollas, Tolland, CT (US); Chen Chen, Willington, CT (US)

(73) Assignee: University of Connecticut, Farmington, CT (US)

( * ) Notice: Subject to any disclaimer, the term of this patent is extended or adjusted under 35 U.S.C. 154(b) by 626 days.

(21) Appl. No.: 17/521,227

(22) Filed: Nov. 8, 2021

(65) Prior Publication Data

US 2022/0143570 A1 May 12, 2022

Related U.S. Application Data

(60) Provisional application No. 63/112,085, filed on Nov. 10, 2020.

(51) Int. Cl.
*B01J 19/00* (2006.01)
*B01J 19/24* (2006.01)
(Continued)

(52) U.S. Cl.
CPC ....... *B01J 19/0033* (2013.01); *B01J 19/2435* (2013.01); *C01C 1/0488* (2013.01);
(Continued)

(58) Field of Classification Search
CPC .... B01J 19/00; B01J 19/0006; B01J 19/0033; B01J 19/24; B01J 19/2415; B01J 19/2435;
(Continued)

(56) References Cited

U.S. PATENT DOCUMENTS

| 2,131,102 A | 9/1938 | Frankl |
| 2,564,985 A | 8/1951 | Mayland |

(Continued)

OTHER PUBLICATIONS

Fernández et al., Chemical looping combustion process in fixed-bed reactors using ilmenite as oxygen carrier: Conceptual design and operation strategy, 2015, Chemical Engineering Journal, 264, 797-806 (Year: 2015).*

(Continued)

*Primary Examiner* — Natasha E Young
(74) *Attorney, Agent, or Firm* — McCarter & English, LLP

(57) ABSTRACT

Systems/methods for continuous operation of fixed bed reactors using gaseous fuels for power generation through integration with a combined cycle power plant are provided. The fixed bed reactors are assumed to operate in a semi-batch mode composed of reactor modules integrated into module trains that comprise the chemical-looping combustion island of the power plant. The scheduling of each reactor train is cast as an optimization problem that maximizes thermodynamic efficiency subject to constraints imposed to each reactor and the entire island. When the chemical-looping reactors are arranged cyclically, each feeding to or being fed from another reactor, in an operating scheme that mimics simulated moving bed reactors, the thermodynamic efficiency of the reactor island can be improved. Allowing the reversal of module order in the cyclically arranged reactor modules further improves the overall thermodynamic efficiency, while satisfying constraints imposed for carbon capture, fuel conversion, power plant safety and oxygen carrier stability.

14 Claims, 23 Drawing Sheets

(51) Int. Cl.
  *C01C 1/04* (2006.01)
  *F23C 3/00* (2006.01)
  *F23C 6/04* (2006.01)
(52) U.S. Cl.
  CPC .............. *F23C 3/002* (2013.01); *F23C 6/04* (2013.01); *B01J 2219/00031* (2013.01); *B01J 2219/00033* (2013.01); *B01J 2219/0004* (2013.01); *B01J 2219/00121* (2013.01)
(58) Field of Classification Search
  CPC .......... B01J 2219/00; B01J 2219/00002; B01J 2219/00027; B01J 2219/00031; B01J 2219/00033; B01J 2219/0004; B01J 2219/00049; B01J 2219/00051; B01J 2219/00121; C01C 1/00; C01C 1/02; C01C 1/04; C01C 1/0405; C01C 1/0488; Y02E 20/00; Y02E 20/34
  See application file for complete search history.

(56) References Cited

U.S. PATENT DOCUMENTS

| | | | |
|---|---|---|---|
| 2,825,721 | A | 3/1958 | Hogan |
| 3,870,474 | A | 3/1975 | Houston |
| 4,449,991 | A | 5/1984 | Brannon |
| 5,989,010 | A | 11/1999 | Martin |
| 8,916,128 | B2 * | 12/2014 | Hoteit ................ C01B 3/42 423/650 |
| 9,259,707 | B2 | 2/2016 | Dubois |
| 10,670,262 | B2 | 6/2020 | Bollas et al. |
| 2010/0292523 | A1 | 11/2010 | Hershkowitz |
| 2012/0214106 | A1 | 8/2012 | Sit |
| 2013/0125462 | A1 | 5/2013 | Greiner |
| 2014/0070144 | A1 | 3/2014 | Chalabi |

OTHER PUBLICATIONS

Chen et al., Semi-Batch Chemical-Looping Reactors Integrated with Considered Cycle Power Plant Operating at Transient Electricity Demand, 2017, Proceedings of the FOCAPO/CPC 2017 Conference, Tucson (Year: 2017).*
Subramaniam, B. et al., Reaction Kinetics on a Commercial Three-way Catalyst: The Carbon Monoxide-Nitrogen Monoxide-Oxygen-Water System, Ind. Eng. Chem. Prod. Res. Dev. 24 (1985) 512-516.
Sapundzhiev, C. et al., Catalytic Combustion of Natural Gas in a Fixed Bed Reactor with Flow Reversal, Chem. Eng. Commun. 125 (1993) 171-186.
Beld, B. et al., Removal of Volatile Organic Compounds from Polluted Air in a Reverse Flow Reactor: An Experimental Study, Ind. Eng. Chem. Res. 33 (1994) 2946-2956.
Chaouki, J. et al., Combustion of Methane in a Cyclic Catalytic Reactor, Ind. Eng. Chem. Res. 33 (1994) 2957-2963.
Ishida, M. et al., A Fundamental Study of a New Kind of Medium Material for Chemical-Looping Combustion, Energy & Fuels. 10 (1996) 958-963.
Ziifle, H. et al., Catalytic combustion in a reactor with periodic flow reversal . Part 1. Experimental results, Chem. Eng. Process. 36 (1997) 327-340.
Xiao, W. et al., An $SO_2$ Converter with flow reversal and interstage heat removal: from laboratory to industry, Chem. Eng. Sci. 54 (1999) 1307-1311.
Duduković et al., Multiphase Catalytic Reactors: A Perspective on Current Knowledge and Future Trends, Catalysis Reviews, 44(1), pp. 123-246, (2002).
Kushwaha, A. et al., Effect of reactor internal properties on the performance of a flow reversal catalytic reactor for methane combustion, Chem. Eng. Sci. 59 (2004) 4081-4093.
Wolf, J. et al., Comparison of nickel- and iron-based oxygen carriers in chemical looping combustion for $CO_2$ capture in power generation, Fuel. 84 (2005) 993-1006.
Wolf, J. et al., Parametric study of chemical looping combustion for tri-generation of hydrogen, heat, and electrical power with $CO_2$ capture, Int. J. Energy Res. 29 (2005) 739-753.
Abad, A. et al., Chemical-looping combustion in a 300 W continuously operating reactor system using a manganese-based oxygen carrier, Fuel. 85 (2006) 1174-1185.
Johansson, E. et al., A 300W laboratory reactor system for chemical-looping combustion with particle circulation, Fuel. 85 (2006) 1428-1438.
Keskitalo, T.J. et al., Kinetic Modeling of Coke Oxidation of a Ferrierite Catalyst, Ind. Eng. Chem. Res. 45 (2006) 6458-6467.
Corbella, et al., Performance in a Fixed-Bed Reactor of Titania-Supported Nickel Oxide as Oxygen Carriers for the Chemical-Looping Combustion of Methan in Multicycle Tests, 2006, Ind. Eng. Chem. Res.; vol. 125, pp. 171-186.
Mattisson, T. et al., Chemical-looping combustion using syngas as fuel, Int. J. Greenh. Gas Control. 1 (2007) 158-169.
Noorman, S. et al., Packed Bed Reactor Technology for Chemical-Looping Combustion, Ind. Eng. Chem. Res. 46 (2007) 4212-4220.
Li, F. et al., Clean coal conversion processes—progress and challenges, Energy Environ. Sci. 1 (2008) 248.
Rydén, M. et al., Novel oxygen-carrier materials for chemical-looping combustion and chemical-looping reforming; $La_xSr_{1-x}Fe_yCo_{1-y}O_{3-\delta}$ perovskites and mixed-metal oxides of NiO, $Fe_2O_3$ and $Mn_3O_4$, Int. J. Greenh. Gas Control. 2 (2008) 21-36.
Rydén, M. et al., Chemical-looping combustion and chemical-looping reforming in a circulating fluidized-bed reactor using Ni-based oxygen carriers, Energy and Fuels. 22 (2008) 2585-2597.
Dudukovic, M.P., Frontiers in reactor engineering., Science. 325 (2009) 698-701.
Glöckler, B. et al., A Heat-Integrated Reverse-Flow Reactor Concept for Endothermic High-Temperature Syntheses. Part I: Fundamentals—Short-Cut Theory and Experimental Verification of a Traveling Endothermic Reaction Zone, Chem. Eng. Technol. 32 (2009) 1339-1347.
Iliuta, I. et al., Chemical-looping combustion process: Kinetics and mathematical modeling, AIChE J. 56 (2010) 1063-1079.
Ortiz, et al., Hydrogen Production by Auto-Thermal Chemical-Looping Reforming in A Pressurized Fluidized Bed Reactor Using Ni-Based Oxygen Carriers, 2010, International Journal of Hydrogen Energy, vol. 35, pp. 151-160.
Håkonsen, S.F. et al., Chemical looping combustion in a rotating bed reactor—Finding Optimal Process Conditions for Prototype Reactor., Environ. Sci. Technol. 45 (2011) 9619-26.
Adanez, J. et al., Progress in chemical-looping combustion and reforming technologies, Prog. Energy Combust. Sci. 38 (2012) 215-282.
Sridhar, D. et al., Syngas Chemical Looping Process: Design and Construction of a 25 $kW_{th}$ Subpilot Unit, Energy & Fuels. 26 (2012) 2292-2302.
Han, L. et al., Heterogeneous modeling of chemical-looping combustion. Part 1: Reactor model, Chem. Eng. Sci. 104 (2013) 233-249.
Zhou, Z. et al., Model-based analysis of bench-scale fixed-bed units for chemical-looping combustion, Chem. Eng. J. 233 (2013) 331-348.
Zhao, Z. et al., Rotary Bed Reactor for Chemical-Looping Combustion with Carbon Capture. Part 1: Reactor Design and Model Development, Energy & Fuels. 27 (2013) 327-343.
Hamers, H.P. et al., Comparison on process efficiency for CLC of syngas operated in packed bed and fluidized bed reactors, Int. J. Greenh. Gas Control. 28 (2014) 65-78.
Han, L. et al., Heterogeneous modeling of chemical-looping combustion. Part 2: Particle model, Chem. Eng. Sci. 113 (2014) 116-128.
Zhou, Z. et al., Kinetics of NiO reduction by $H_2$ and Ni oxidation at conditions relevant to chemical-looping combustion and reforming, Int. J. Hydrogen Energy. 39 (2014) 8535-8556.
Zhou, Z. et al., Overview of Chemical-Looping Reduction in Fixed Bed and Fluidized Bed Reactors Focused on Oxygen Carrier Utilization and Reactor Efficiency, Aerosol Air Qual. Res. 14 (2014) 559-571.

(56) References Cited

OTHER PUBLICATIONS

Zhou, Z. et al., Continuous regime of chemical-looping combustion (CLC) and chemical-looping with oxygen uncoupling (CLOU) reactivity of CuO oxygen carriers, Applied Catalysis B: Environmental 166-167, (2015) pp. 132-144.

Zhou, Z. et al., Model-assisted analysis of fluidized bed chemical-looping reactors, Chemical Engineering Science 134, (2015) pp. 619-631.

U.S. Appl. No. 63/112,085, filed Nov. 10, 2020.

* cited by examiner

| Process | Material Carrier(s) | $\frac{M}{NH3}$ | $\frac{MJ}{vskt}$ | $\frac{\$M}{NH3}$ | $\frac{CO_2}{NH3}$ | $H_2$ form used |
|---|---|---|---|---|---|---|
| NH-CLAS-1 | Ca | 1.56 | 0.0055 | 0.34 | 0 | $H_2$ |
| NH-CLAS-1 | Sr | 1.3 | 0.103 | 40.11 | 0 | $H_2$ |
| NH-CLAS-1 | Ni | 3 | 0.245 | 1.02 | 0 | $H_2$ |
| NH-CLAS-1 | Mg | 2.5 | 0.1525 | 10.11 | 0 | $H_2$ |
| NH-CLAS-1 | Pd | 9.23 | 0.0085 | 35,793.45 | 0 | $H_2$ |
| NH-CLAS-1 | Rb | 26.17 | 0.27 | 35,645.31 | 0 | $H_2$ |
| NH-CLAS-4 | Ta | 6.56 | 0.05 | 282.40 | 0 | $H_2$ |
| NH-CLAS-6 | Mo - Pd | 11.43 | 0.164 | 3,065.34 | 0 | $H_2$ |
| NH-CLAS-6 | Ta - Cr(I) | 9.72 | 0.236 | 359.28 | 0 | $H_2$ |
| NH-CLAS-6 | Ta - Cr(II) | 11.27 | 0.239 | 364.34 | 0 | $H_2$ |
| NH-CLAS-6 | Ta - Mn(III) | 8.33 | 0.208 | 287.22 | 0 | $H_2$ |
| NH-CLAS-6 | Ta - Mn(V) | 9.44 | 0.22 | 287.22 | 0 | $H_2$ |
| NH-CLAS-6 | Ta - Mo | 8.04 | 0.181 | 261.23 | 0 | $H_2$ |
| CN - CLAS | K | 1 | 0.463 | 0.51 | 1 | $H_2O$ |
| CN - CLAS | Na | 1 | 0.41 | 0.07 | 1 | $H_2O$ |
| CN - CLAS | Rb | 1.61 | 0.532 | 2,029.17 | 1 | $H_2O$ |
| NO-CLAS | Mo | 2 | 0.907 | 3.05 | 1 | $H_2O$ |
| NO-CLAS | Mn(V) | 2.5 | 0.258 | 0.26 | 0.2 | $H_2O$ |
| NO-CLAS | W | 2.22 | 0.0046 | 10.18 | 1 | $H_2O$ |

FIGURE 12

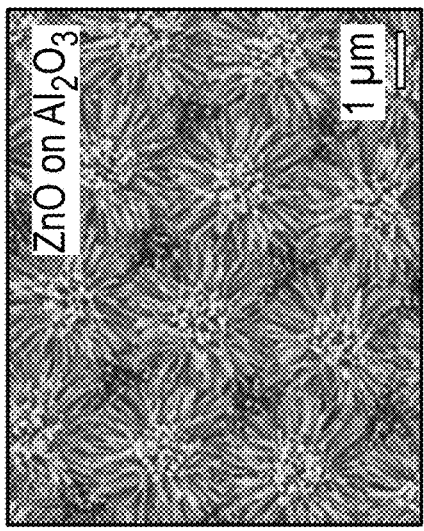
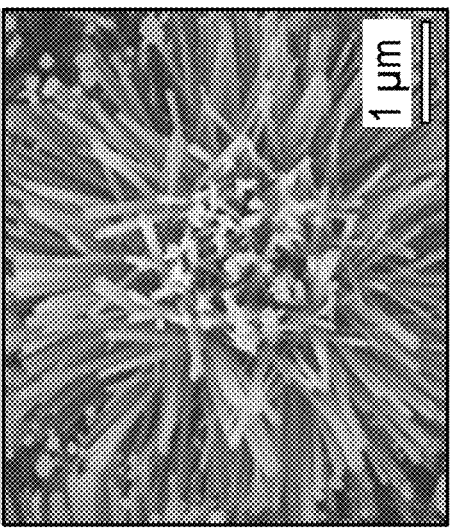
FIG. 13F
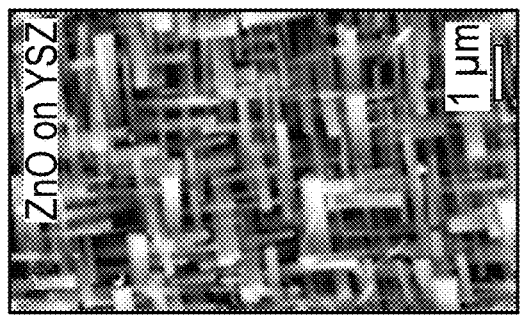
FIG. 13C
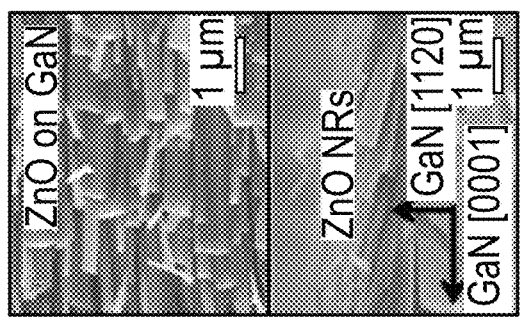
FIG. 13B
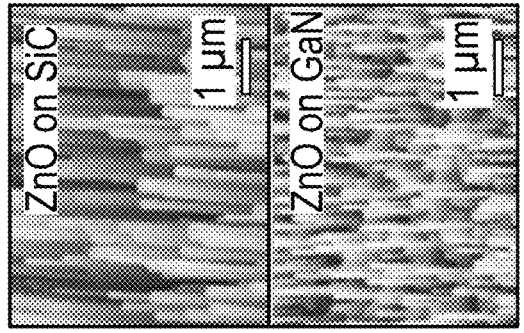
FIG. 13A
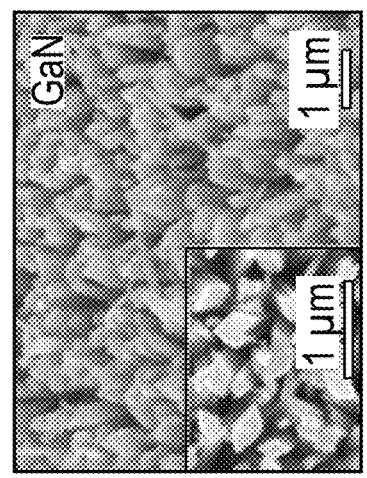
FIG. 13E
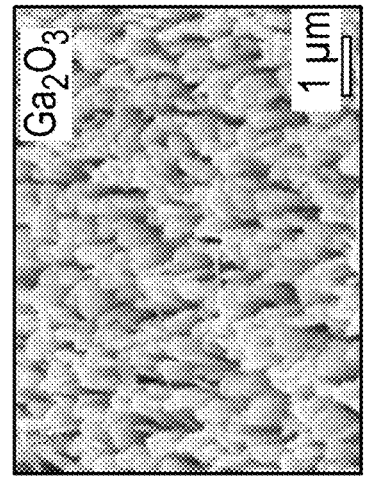
FIG. 13D

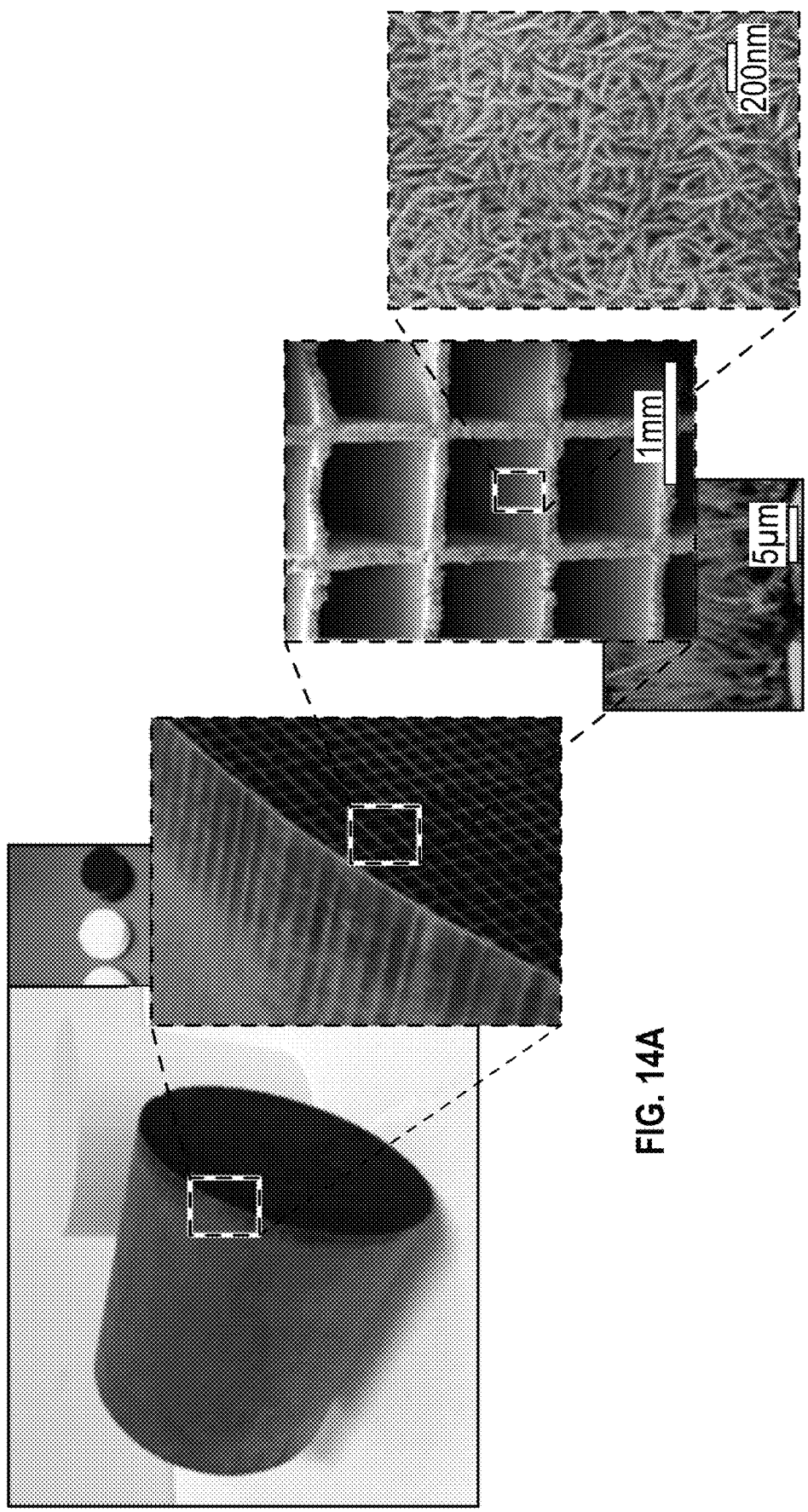

SCHEDULING OF SEMI-BATCH CHEMICAL-LOOPING REACTORS

CROSS-REFERENCE TO RELATED APPLICATION

This application claims priority benefit to a U.S. provisional application entitled "Design and Scheduling of Semi-Batch Chemical-Looping Reactors," which was filed on Nov. 10, 2020 and assigned Ser. No. 63/112,085. The entire content of the foregoing provisional application is incorporated herein by reference.

STATEMENT OF GOVERNMENT RIGHTS

This invention was made with government support under Grant No. 1054718 awarded by the National Science Foundation. The government has certain rights in the invention.

BACKGROUND a. Technical Field

The present disclosure is directed to systems/methods for continuous operation of fixed bed reactors using gaseous fuels for the purpose of power generation through integration with a combined cycle power plant. The fixed bed reactors are assumed to operate in a semi-batch mode composed of reactor modules that are integrated into module trains that comprise the chemical-looping combustion island of the power plant. The scheduling of each reactor train is cast as an optimization problem that maximizes thermodynamic efficiency subject to constraints imposed to each reactor and the entire island. When the chemical-looping reactors are arranged cyclically, each feeding to or being fed from another reactor, in an operating scheme that mimics simulated moving bed reactors, the thermodynamic efficiency of the reactor island can be improved. Allowing the reversal of module order in the cyclically arranged reactor modules further improves the overall thermodynamic efficiency (to 84.7%), while satisfying constraints imposed for carbon capture, fuel conversion, power plant safety and oxygen carrier stability.

In addition, the present disclosure is directed to a system and method for chemical-loop reactor-based processing, wherein the processing employs distributed and modular chemical manufacturing options. The system/method is effective in synthesizing transportable ammonia from stranded natural gas and advantageously leverages chemical loops of metal imides and/or metal nitrides.

b. Background Art

The main cause of climate change and global warming is the emission of greenhouse gases, specifically $CO_2$ from the energy and industrial sectors. The use of renewable and clean power is an approach to alleviate environmental problems in the emerging countries that largely depend on fossil fuels. However, renewable energy has issues of higher upfront cost, intermittent operation, energy storage requirements, and geographic limitations. The dominant energy resources for the power generation sector are still fossil fuels, projected to provide more than 77% of total energy consumption in the world until 2050. Therefore, the urgency of mitigating $CO_2$ emissions from fossil fuel combustion necessitates the deployment of Carbon Capture and Sequestration (CCS) technologies. Chemical-looping combustion (CLC) is a promising alternative to post-combustion CCS technologies, because it inherently separates $CO_2$ from other flue gas components and particularly $N_2$.

In CLC, metal oxides are used as oxygen carrier (OC) to eliminate the mixing of fuel with air in the combustor; thus, avoiding additional equipment or significant energy penalty for the separation of $CO_2$ from $N_2$ at the combustor exhaust. The energy penalty of other CCS technologies integrated with power generation system has been estimated at 7-14%, whereas, CLC has an estimated associated energy penalty around 4-5%, including 1-2% for oxygen carrier redox processing and the rest for $CO_2$ compression.

Early studies have estimated the cost of $CO_2$ capture for CLC to be about 50% lower than other CCS technologies. Significant progress has been made to commercialize CLC, with comprehensive reviews on its technological progress published by Adnez et al. [J. Adanez et al., "Progress in Chemical-Looping Combustion and Reforming technologies," *Progress in Energy and Combustion Science*, vol. 38, no. 2, pp. 215-282, 2012], Hossain and de Lasa [M. M. Hossain et al., "Chemical-looping combustion (CLC) for inherent $CO_2$ separations—a review," *Chemical Engineering Science*, vol. 63, no. 18, pp. 4433-4451, 2008], and Lyngfelt et al. [A. Lyngfelt et al., "Chemical-Looping Combustion-Status of Development," in *9th International Conference on Circulating Fluidized Beds (CFB-9)*, (Hamburg), 2008]. In the efforts to increase power plant efficiency, CLC was proposed to integrate with combined cycle (CC) power plants that utilize a combination of Brayton cycle and Rankine cycle. Compared to CLC fueled by solid feed stocks, natural gas-fueled CLC-CC power plants were shown to reduce the energy penalty of pre-combustion and gasification steps, which can be up to 4.5%.

The challenges of integrating CLC with power plants has led to various proposed designs of chemical-looping reactors, such as interconnected fluidized reactors, fixed bed reactors, spouted beds, moving beds, and rotary bed reactors. The design of the main candidate reactor configuration for commercial CLC realization consists of two interconnected fluidized beds, between which the oxygen carrier is circulating. This design offers advantages in terms of high gas/solid heat and mass transfer rates, stable and uniform operating temperature, and continuous operation. However, the requirements for large scale fluidization and issues with oxygen carrier attrition are challenging. Moreover, most of the operational experience of fluidized bed or moving bed CLC units was gained at atmospheric pressure and research is on-going to design and operate reactors that can accomplish stable circulation and fluidization of the oxygen carrier at the scale conceptualized for power generation.

Another promising reactor system developed for chemical-looping combustion adapts the moving bed design. Movement of solid fuel and oxygen carrier is countercurrent, so that the fresh or regenerated oxygen carrier is fed at the top and flows down the reactor, while fuel is fed at the bottom moving upwards. Chiu et al. compared the performance of moving bed reactors with that of fluidized bed reactors and concluded that the former have superior fuel conversion efficiency and better oxygen carrier utilization [P. C. Chiu et al., "Spent isopropanol solution as possible liquid fuel for moving bed reactor in chemical looping combustion," *Energy & Fuels*, vol. 28, no. 1, pp. 657-665, 2013].

The promise of higher efficiency from CLC-CC plants can be realized in processes that operate at high pressures (>20 bar) and high temperatures (>1000° C.). This would enable the seamless integration of the CLC island with the compressors and gas turbines of the Brayton cycle. The design of fixed-bed reactors is more suitable for integration with CC power plants, since it avoids issues of gas-solid separation, loop sealing between reactors, and oxygen carrier material loss at high-pressure operation. Moreover, fixed bed reactors are more compact, which translates to lower capital cost, and smaller process footprint. The main challenge of fixed bed CLC reactors relates to their batch-type, dynamic operation and the need for high-temperature valves.

To address the issue of temperature gradients inside and at the outlet of the reactor, Spallina et al. [V. Spallina et al., "Reactor design and operation strategies for a large-scale packed-bed CLC power plant with coal syngas," *International Journal of Greenhouse Gas Control*, vol. 36, pp. 34-50, 2015] devised a control strategy balancing reduction and oxidation conditions so that the operation of fixed bed reactors can be tuned for integration with CC power plants. Furthermore, Chen et al. [C. Chen et al., "Dynamic Simulation of Fixed-Bed Chemical-Looping Combustion Reactors Integrated in Combined Cycle Power Plants," *Energy Technology*, vol. 4, pp. 1209-1220 Oct. 2016; C. Chen et al., "Optimal design of combined cycle power plants with fixed bed chemical looping combustion reactors," *AIChE Journal*, vol. 65, p. e16516, July 2019] explored process intensification options for near-carbon-neutral, natural-gas-fueled combined cycle (CC) power plants, wherein the conventional combustor was replaced by a series of chemical-looping combustion (CLC) reactors. Dynamic modeling and optimization were deployed to design CLC-CC power plants with optimal configuration and performance, on the basis of validated reference power plant models.

In the work by Han et al. and Zhou et al., dynamic models were used to study and compare the performance of fixed bed and fluidized bed reactors for gas-fueled CLC systems. The advantages of a reverse-flow reactor concept were explored, first by reversing the flow direction of feed in the fixed bed reactor undergoing oxygen carrier reduction [L. Han et al., "Chemical-looping combustion in a reverse-flow fixed bed reactor," Energy, vol. 102, pp. 669-681, May 2016]. The design of integrating CLC-CC power plants was proven to be feasible by replacing the conventional combustor with a CLC island made up of a series of fixed bed reactors operating in parallel. In this work, a concept of simulated moving bed (SMB) made up of multiple fixed bed reactors in cyclic arrangement is proposed for chemical-looping combustion. The objective is to maximize the energy efficiency, while avoiding high-pressure fluidization, attrition and excessive process footprint. The SMB process is accomplished by switching the inlet and outlet ports simultaneously along the axial dimension of a fixed bed to simulate the counter-current movement of solids and fuel. Simulated moving bed reactors have been proven to increase efficiency and overcome equilibrium-restricted reactions in absorption, adsorption and extraction processes, such as reactive chromatography. They are a form of reactor intensification and enable modularization of chemical processes. As it will become more clear in this document, the standard SMB design was not proven to be optimal for CLC, from the efficiency point of view. Instead, the optimal scheduling of semi-batch reactors in cyclic arrangement revealed more complex patterns of gas switching that improve the thermodynamic efficiency of the process.

Despite efforts to date, a need remains for improved systems/methods for continuous operation of fixed bed reactors using gaseous fuels for the purpose of power generation through integration with a combined cycle power plant.

SUMMARY

The advantageous systems/methods of the present disclosure are presented herein as follows: (i) first, the state of the art in CLC reactor design is briefly reviewed and the benefits of the disclosed systems/methods are explained; (ii) then, the optimization and scheduling problem for semi-batch reactors in cyclic arrangement is presented; followed by (iii) the process model and the parametric assumptions of the problem; (iv) finally, case studies are designed to assist with the analysis of the concept (two- and a three-reactor module systems are designed and optimized) and the results of optimization for these case studies are presented.

Additional features, functions and benefits associated with the disclosed systems/methods will be apparent from the description which follows, particularly when read in conjunction with the accompanying figures.

BRIEF DESCRIPTION OF THE FIGURES

To assist those of skill in the art in making and using the disclosed systems/methods, reference is made to the appended figures, wherein:

FIG. 5A shows Ni conversion of normal fixed bed;
FIG. 5B shows normal fixed bed temperature (C);
FIG. 5C shows Ni conversion of Case I;
FIG. 5D shows bed temperature of Case I (C);
FIG. 5E shows Ni conversion of Case II; and
FIG. 5F shows bed temperature of Case II (C);

FIG. 6A—the reference fixed bed reactor,
FIG. 6B—the reactor train of Case I with two reactor modules, and
FIG. 6C—the reactor train of Case II with three reactor modules FIGS. 7A-7I provide dynamic profiles of exit gas temperature, enthalpy, and composition, wherein R1: the gas exiting R1; R2: the gas exiting R2; R3: the gas exiting R3; Modularized bed: the gas exiting each individual reactor module), as follows:

FIG. 12 is a comparative ranking of CLAS in the feasible set. M/NH3 is the molar ratio of material carrier need to synthesis one mole of ammonia. MJ/mol is the energy input (MJ) required to synthesis one mole of ammonia. $M/NH3 is the initial cost of the material carrier required to synthesis one mole of ammonia in the given chemical loop and material carrier combination. COx/NH3 is the molar ratio of carbon dioxide or carbon monoxide released per mole of ammonia as a result of the reactions in the chemical loop. H2 form used represents the form of hydrogen used in the chemical loop. Additional chemistry needed refers to the additional consumable feedstock needed, beyond nitrogen and hydrogen, to execute the given chemical loop.
FIGS. 13A-13F provide a series of images of ceramic nanorod (NR) arrays grown using vapor or solution phase methods, as follows:
FIG. 13A shows vertical ZnO NRAs on single crystal SiC (0001) and GaN (0001) substrates
FIG. 13B shows tilted ZnO NRAs on GaN (11-20).
FIG. 13C shows ZnO nanonetwork on YSZ (010).
FIG. 13D and FIG. 13E show Ga2O3 and GaN NRAs on Al2O3.
FIG. 13F shows ZnO NRAs with radial orientations on lithography-patterned Al2O3.

FIGS. 14A-14I provide a series of images, as follows:
FIG. 14A shows a nanoarray assembly process on cordierite and stainless steel monoliths.
FIG. 14B shows a 4.7"×4" nanoarray integrated catalytic converter.
FIG. 14C—FIG. 14I show SEMs of metal oxide nanoarrays on monoliths, as follows:
FIG. 14C—Low magnification view of cordierite monolithic channels grown with ZnO nanorod arrays;
FIGS. 14D and 14E—Top and cross-sectional views of Co3O4 porous nanowire arrays on cordierite monolith;
FIG. 14F-FIG. 14I show ZnO nanorod arrays, TiO2 nanorod arrays, CeO2 nanotube arrays, Co3O4 porous nanowire arrays on cordierite monoliths, respectively, which can be easily converted to nitrides or imides through thermal nitridation.
FIG. 15 is a calcium hydroxide CLAS Aspen Flowsheet,
and FIG. 16 is a strontium hydroxide CLAS Aspen Flowsheet.

DESCRIPTION OF EXEMPLARY EMBODIMENTS

1. CLC Reactor Design Background and Benefits of Disclosed Systems/Methods

In a fixed bed reactor, the oxygen carrier is stationary in the reactor bed with the fuel and air streams alternatively and periodically switched for successive cycles of reduction, oxidation, and heat removal. During the reduction stage, a gaseous fuel is fed to the reactor filled with oxidized oxygen carrier. At high temperature, the oxygen carrier is reduced and the fuel is converted to $CO_2$ and $H_2O$. The reduction stage is stopped when fuel conversion reaches a predetermined lower bound and then, the reactor is briefly purged with inert gas. Oxidation commences with feeding air to the reactor to oxidize the reduced oxygen carrier, producing a stream rich in $N_2$, unreacted $O_2$ and $CO_2$ from the combustion of any carbon formed on the oxygen carrier during the reduction stage. Depending on the oxygen carrier, oxidation is exothermic and leaves a significant amount of residual heat in the reactor (in the form of hot oxygen carrier).

When the oxidation flue gas reaches a temperature appropriate for operating a gas turbine, a heat removal stage commences. For the integration of CLC with CC plants, the heat removal exhaust will be expanded by the bottoming gas turbine of the power generation system. The CLC reactor is then again purged with inert gas and the system restarts the cycle by repeating the reduction stage. As discussed in Chen and Bollas, all of the exhaust streams of the various CLC stages can be used for heat recuperation in the CLC reactor, and the gas and steam turbines of the power plant. However, the stream that results in higher plant efficiency is the heat removal stream and that needs to be maximized in terms of total enthalpy produced per enthalpy of the fuel provided.

According to the present disclosure, optimal gas switching patterns in semi-batch fixed bed reactors that are arranged cyclically and operate at high pressure and temperature with a gaseous fuel are disclosed. These reactor configurations are disclosed in terms of their capability to deliver a relatively constant temperature/enthalpy exhaust gas stream during the CLC heat removal stage to a downstream gas turbine of a power generation plant. A plain SMB circumvents operational challenges of stream contamination, gas leak, and particle attrition in moving beds operating at high pressure, and could potentially offer higher quality heat streams suitable for gas turbines than a standard fixed bed.

Figure 1:
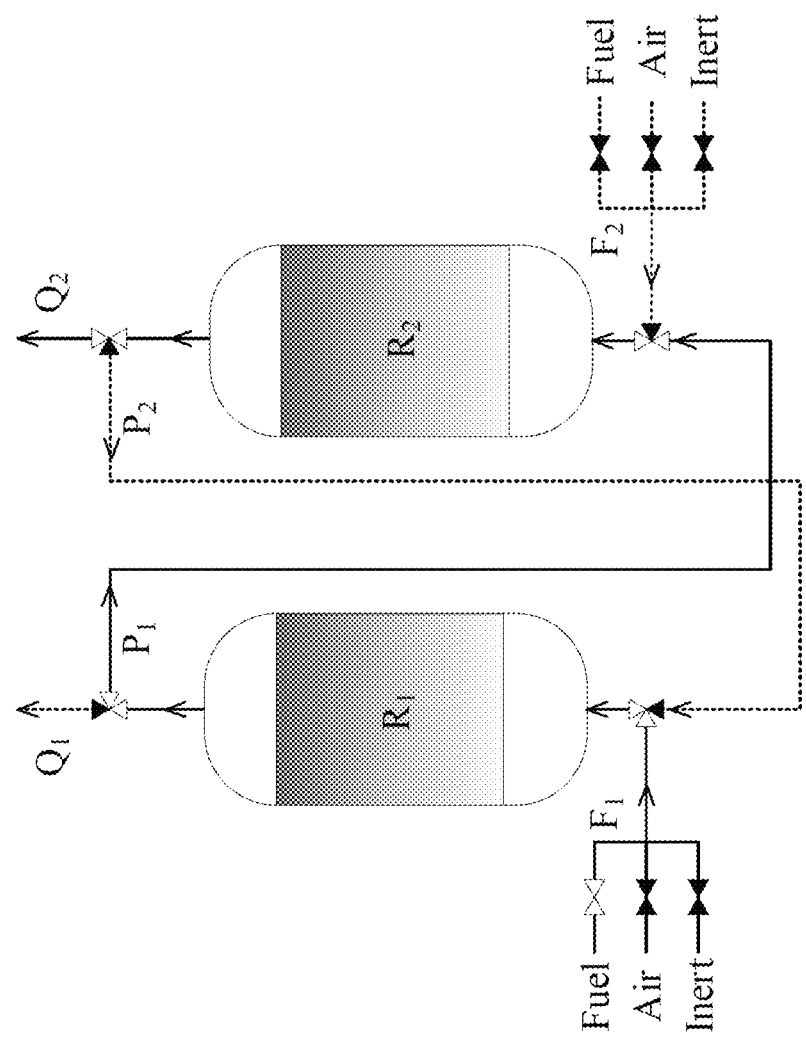
FIG. 1 is a simplified diagram of a CLC reactor train operating in SMB mode.

As shown in FIG. 1, n fixed bed reactor modules would comprise a CLC SMB, with valves located at the inlet and outlet of each reactor module. During reduction, the fuel valve is open, and the other two valves of air and inert gas are closed. Fuel is first fed through the inlet of the first reactor, $R_1$, and the gas flows through $F_1 \rightarrow R_1 \rightarrow P_1 \rightarrow R_2 \rightarrow P_2 \rightarrow \ldots \rightarrow R_{n-1} \rightarrow P_{n-1} \rightarrow R_n \rightarrow Q_n$. Once the reduction stage in $R_1$ is completed, the fuel is sent to the second reactor, $R_2$, and the gas flows through $F_2 \rightarrow R_2 \rightarrow P_2 \rightarrow \ldots \rightarrow R_{n-1} \rightarrow P_{n-1} \rightarrow R_n \rightarrow P_n \rightarrow R_1 \rightarrow Q_1$ by switching inlet and outlet port valves. The SMB commences the oxidation stage when the last reactor ($R_n$) finishes the reduction stage, and follows a sequence of valve control actions similar to that of the reduction stage. In the heat removal and purge stages, air flows through $F_1 \rightarrow R_1 \rightarrow P_1 \rightarrow R_2 \rightarrow P_2 \rightarrow \ldots \rightarrow R_{n-1} \rightarrow P_{n-1} \rightarrow R_n \rightarrow Q_n$, pushing the residual heat or gases out of each reactor module.

Depending on the temperature distribution across reactor modules, optimal heat removal techniques can be devised. Starting with the concept of SMB, a modularized train of fixed bed reactors with port valves controlling inlet and outlet flows offers a generalization of the concept as a scheduling problem of interconnected semi-batch reactors. One instantiation of this generalized scheduling problem was the reverse-flow reactor proposed by Han and Bollas. To achieve reverse flow operation, the feed can be sent to the last reactor $R_n$ first, while reactor products exit from the outlet of the first reactor $R_1$, and any $R_{j-1}$ is fed by the exhaust of $R_j$, where $R_j$ is the $j^{th}$ reactor of the reactor train of FIG. 1. In summary, the potential to relax the limitations of conventional fixed bed CLC reactors is disclosed, by manipulating the gas entrance and exit points, as well as the order of reactor modules, periodically to improve mass and energy gradients inside the bed, thus improving oxygen carrier utilization and energy efficiency with respect to power generation.

2. Reactor Scheduling and Optimization Strategy

As disclosed herein, the optimization strategy developed for the integration of CLC reactors in a CC power plant is provided and an optimization problem to mathematically express the same is formulated. For purposes of the present disclosure, the following definitions apply:

CLC reactor island: comprises a number of fixed bed reactor trains that operate for heat generation in a CC power plant.

CLC reactor train: is the train of fixed bed reactor modules in cyclic arrangement replacing one conventional fixed bed CLC reactor.

CLC reactor module: is the R reactor module in each reactor train, as shown in FIG. 1.

To calculate an operating strategy for the CLC train of modular fixed bed reactors, an optimization problem is proposed to maximize the energy efficiency of each reactor train, expressed as the fraction of enthalpy extracted in the heat removal stage and sent to the gas turbine of a CC power plant over the total energy output of the reactor, as shown in Eq. (1):

$$\eta_{HR} = \frac{\int_{t_0}^{\tau_{hr}} (\dot{m}_{out}(t) h_{out}(t)) dt}{\int_{t_0}^{\tau_{cycle}} (\dot{m}_{out}(t) h_{out}(t)) dt} \quad (1)$$

where $T_{out}$, $\dot{m}_{out}$, $h_{out}$ are the temperature, mass flow rate, and enthalpy of the exhaust stream, $\tau_{hr}$ is the time duration of heat removal stage, and $\tau_{cycle}$ is the time interval for one complete redox cycle. Heat removal is the useful stage of the oxidation cycle, wherein the heat liberated from the exothermic oxidation reaction is removed from the bed through convection. This high-temperature air stream is expanded by the gas turbine of the combined cycle, while the other low-quality streams could be utilized by other components in the power generation system. The decision variables used for the optimization problem include the duration of the reduction stage, the time spent for the reduction/oxidation of each reactor module-expressed through time interval coefficients, the temperature and flow rate of the inlet air for heat removal and oxidation, and the oxygen carrier properties (e.g., active loading of the metal oxide), as summarized in Table 1.

TABLE 1

Control variables in the optimal control problem of the CLC reactor train.

| Control variables | Notation |
| --- | --- |
| Air feed rate for oxidation and heat removal | $\dot{m}_{air}$ |
| Air temperature for oxidation and heat removal | $T_{air}$ |
| Reduction time interval | $\tau_{red}$ |
| Reduction interval coefficient | a |
| Oxidation interval coefficient | b |
| Metal oxide content in oxygen carrier | ω |

The set of control variables is summarized in the design vector, φ, shown in Eq. (2), which is constrained by upper and lower limits permitted in the design space, Φ:

$$\varphi = [\dot{m}_{air}, T_{air}, \tau_{red}, a, b, \omega] \in \Phi. \quad (2)$$

To deliver a continuous fuel stream, each reactor train needs to be operated with a time delay, $\tau_{delay} = (i-1) \times \tau_{red}$, for the $i^{th}$ train in the CLC island with $\tau_{red}$ as the total interval of the reduction stage. Obviously, $\tau_{red}$ is the dominant time scale for the overall process, because it decides fuel consumption and conversion, and carbon capture or formation. For $n_{CLC}$ trains operating in parallel, continuous feeding of the fuel imposes that the complete CLC cycle is $n_{CLC} \times \tau_{red}$ where $n_{CLC}$ is the number of reactor trains used in a CLC island. The CLC train needs to deliver a temperature profile of narrow deviation around a desired temperature in the heat removal stage exhaust feeding the CC gas turbine. The oxidation stage interval is set to $\tau_{ox} = n_{ox} \times \tau_{red}$, and the heat removal stage interval is $\tau_{hr} = n_{hr} \times \tau_{red}$, where $n_{ox}$ is the number of reactor trains operating at the oxidation stage at any time, and $n_{hr}$ is the number of reactor trains operating at the heat removal stage at any time. The corresponding time interval for the oxidation stage is then imposed as the constraint of Eq. (3):

$$\tau_{ox} = (n_{CLC} - n_{hr} - 1) \times \tau_{red} - 2\tau_{pu}. \quad (3)$$

Figure 2:
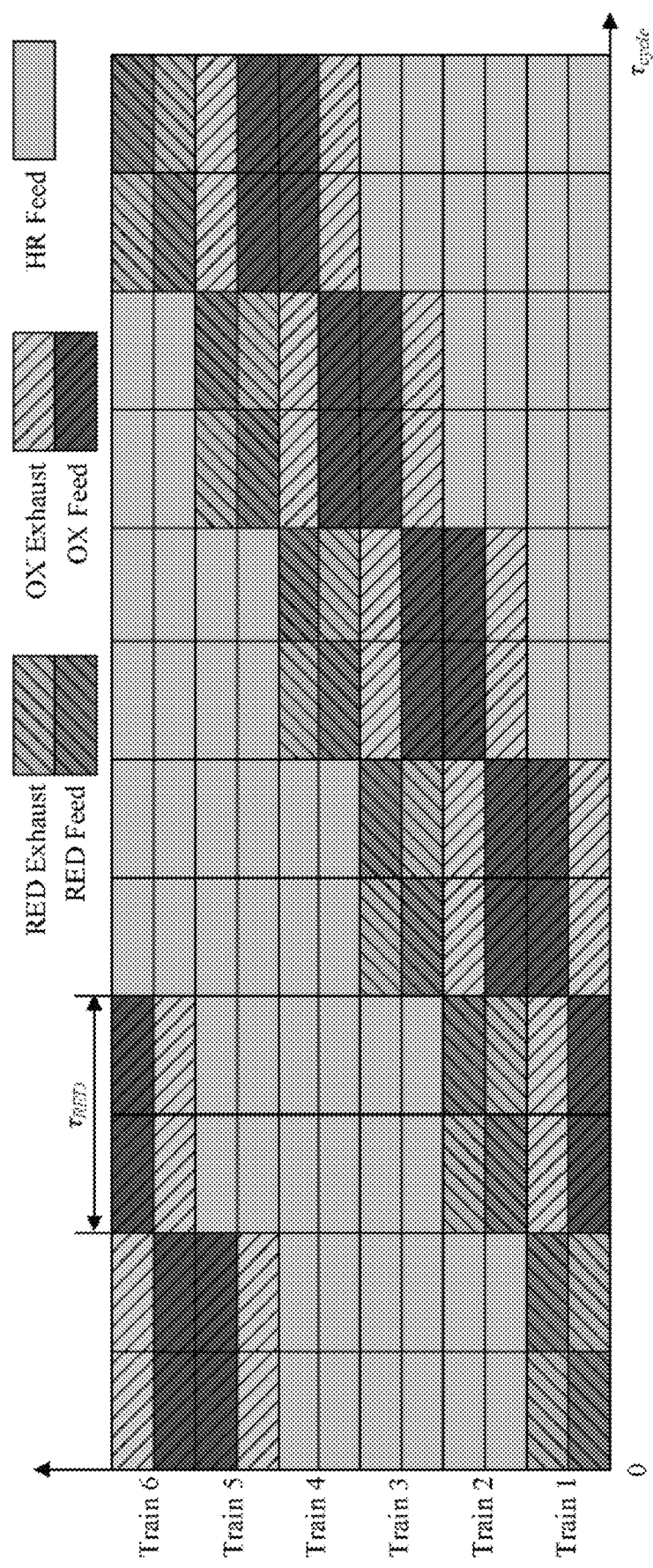
FIG. 2 is an exemplary operation sequence of CLC reactor trains and modules of a CLC island with 6 reactor trains, consisting of 2 reactor modules each, for one complete CLC cycle time.

The corresponding scheduling strategy is shown in FIG. 2 for a simple case where each CLC train has two fixed bed reactor modules, $n_{mod} = 2$. The island includes six trains, $n_{CLC} = 6$. The duration of one complete CLC cycle is $6 \times \tau_{red}$. There are three reactor trains operating at the heat removal stage at any point in time, with two reactors operating at the oxidation stage at any point in time. If the duration of reactors operating at the purge stage is neglected, then $\tau_{ox} = 2 \times \tau_{red}$. In summary, at any time in the CLC island, the number of reactor modules operating at reduction, oxidation, and heat removal, are one, two, and three, respectively.

Further, for a train including $n_{mod}$ fixed bed reactor modules, the duration of reduction and oxidation is as presented in Eqs. (4) and (5). Each train distributes the stage across its $j^{th}$ reactor module so that the total time spent by any one train on any one stage equals that of Eq. (3).

$$\tau_{red,j} = a_j \times \tau_{red}, \quad (4)$$

$$\tau_{ox,j} = b_j \times \tau_{ox}, \quad (5)$$

$$\sum_{j=1}^{n_{mod}} a_j = 1, \quad (6)$$

$$\sum_{j=1}^{n_{mod}} b_j = 1, \quad (7)$$

where j denotes the $j^{th}$ fixed bed reactor module in each CLC reactor train and $n_{mod}$ is the total number of fixed bed reactor modules used in one reactor train. Eqs. (4)-(7) define the vectors a and b in Eq. (2).

Maximization of the heat removal efficiency of the CLC island, is equivalent to maximization of the CLC efficiency of each CLC reactor train, as expressed in Eq. (1). It is also necessary to take into account the trade-off of efficiency with performance metrics that relate to $CO_2$ capture. Acceptable lower bounds for CLC processes are ≥96% $CO_2$ capture efficiency, $S_{CO}$, and ≥98% fuel conversion, $X_{fuel}$, as shown in Eqs. (8) and (9). Additional constraints to maintain a stable $T_{out}(t)$ during heat removal within a set tolerance, δ, from the Turbine Inlet Temperature set-point, TIT, reasonable pressure drop, ΔP, across the reactor, and maximum allowable internal temperature, $T^{max}$, are incorporated, as shown in Eqs. (10) and (12):

$$S_{CO_2}(t) = \frac{\int_{t_0}^{\tau_{RED}} (F_{out}(CO_2, t))dt}{\int_{t_0}^{\tau_{RED}} (F_{in}(CH_4, t))dt} \geq 96\%, \quad (8)$$

$$X_{fuel}(t) = 1 - \frac{\int_{t_0}^{\tau_{RED}} (F_{out}(CH_4, t))dt}{\int_{t_0}^{\tau_{RED}} (F_{in}(CH_4, t))dt} \geq 98\%, \quad (9)$$

$$TIT - \delta \leq T_{out}(t) \leq TIT + \delta, \quad (10)$$

$$\Delta P \leq \Delta P^{max}, \quad (11)$$

$$T(t, z) + \delta \leq T^{max}. \quad (12)$$

The optimal control problem can then be formulated as follows:

$$\max_{\varphi} \eta_{HR}(t) \quad (13)$$

Subject to

Eqs. (3-12)

$f(\dot{x}(t), x(t), u(t), \theta, t) = 0,$ $f_0(\dot{x}(t), x(t), u(t), \theta, t) = 0,$ $y(t) = h(x(t)),$ $x^{min} \leq x \leq x^{max},$ $u^{min} \leq u \leq u^{max},$ $\tau_i^{min} \leq \tau_i \leq \tau_i^{max}$ -continued $\forall i \in [1, N_{stages}],$ $\omega^{min} \leq \omega \leq \omega^{max}.$ In Eq. (13), f is the set of DAEs describing the CLC reactions and hydrodynamics inside a fixed bed reactor, with its initial conditions and constraints for states x, admissible inputs u, cycle times $\tau_i$ for each stage i, and metal oxide content in the oxygen carrier w. Since it normally takes more than 1 redox cycle to reach cyclic steady-state, the time horizon of the optimization was set to at least 3 times the $\tau_{cycle}$. By using an extended time horizon, a periodicity condition was ensured in the optimization problem. Eq. (13) was formulated and solved in the commercial software package gPROMS, with the reactor model f and problem parameterization discussed in the next section. The DAEs were solved using backwards finite differences for the bulk flow through the reactor and central finite differences for the solid phase with a sequence of alternating boundary conditions (for oxidation, heat removal, reduction and purge) as in the example shown in FIG. 2, with $\tau_{red}$, a and b as the time-relevant optimization variables in φ constrained by Eqs. (3)-(7). The dynamic optimization problem was solved with the Outer Approximation-Equality Relaxation-Augmented Penalty algorithm of gPROMS.

3. Reactor Model i. Fixed Bed Reactor Model

The CLC reactor model referenced in this disclosure was developed upon the heterogeneous CLC reactor and kinetics model presented by Han and Bollas. The heterogeneous model simulates the dynamic performance of a CLC fixed bed reactor undergoing subsequent reduction/purging/oxidation/heat removal, taking into account the effect of particle properties and the reactivity of Ni-based oxygen carriers. Specifically, the reactor is assumed to be adiabatic and one-dimensional, so that radial temperature and concentration gradients are negligible. The model calculates the mass and heat transfer between the solid and the fluid phase and intra-particle diffusion.

The fluid phase is assumed to follow axially dispersed, non-ideal plug flow regime with a momentum balance described by the Ergun equation. The reactor model was validated against literature and experimental data, for a variety of Ni-based oxygen carriers, operating conditions and reaction temperatures. A kinetics model was evolved from the early analyses of Zhou et al., who studied the gas-solids reaction kinetics for Cu- and Ni-based oxygen carriers, to the framework presented by Han et al.—who studied inter- and intra-particle diffusion effects of oxygen carriers of variable particle size. Later, Han et al.—studied the structural identifiability and distinguishability of candidate kinetic models for NiO reduction and Ni oxidation reactions, addressing literature controversies in terms of prominent reaction networks, kinetic mechanisms, and kinetic parameters. The kinetic model of Han et al.—was extended to high-pressure fixed bed CLC experiments with Cu- and Ni-based oxygen carriers with use of semi-empirical formulas and the kinetic model was verified for pressures ranging from 1 to 10 atm.

With the kinetics reported in the literature, the one-dimensional heterogeneous fixed bed model for the fluid phase is:

$$\varepsilon_b \frac{\partial C_i}{\partial t} + \frac{\partial F_i}{\partial V} = \varepsilon_b \frac{\partial}{\partial z}\left(D_{ax,i} \frac{\partial C_i}{\partial z}\right) + k_{c,i} a_v (C_{c,i}|_{R_p} - C_i) \quad (14)$$

where $\varepsilon_b$ is the bed porosity, Ci is the concentration of gas species i in the fluid phase, $F_i$ is the molar flow rate of gas species i, V is the volume, $D_{ax,i}$ is the axial dispersion coefficient of species i, $k_{c,i}$ is the mass transfer coefficient between bulk fluid and oxygen carrier particles, $a_v$ is the external particle surface area per unit volume, and $C_{c,i}$ is the concentration of gas species i in the solid phase. The bulk phase energy balance is:

$$\varepsilon_b C_{p,f} C_T \frac{\partial T}{\partial t} + C_{p,f} F_T \frac{\partial T}{\partial V} = \varepsilon_b \frac{\partial}{\partial z}\left(\lambda_{ax}\frac{\partial T}{\partial z}\right) + h_f a_v (T_c|_{R_p} - T)$$

where $C_{pf}$ is the heat capacity of the bulk gas mixture, T is the bulk temperature, $F_T$ is the total molar gas flow, $\lambda_{ax}$ is the axial heat dispersion coefficient, $h_f$ is the heat transfer coefficient between bulk fluid and oxygen carrier particle, and $T_c$ is the solid phase temperature.

For the particle phase the mass and energy balances are:

$$\varepsilon_c \frac{\partial C_{c,i}}{\partial t} = \frac{1}{r^2}\frac{\partial}{\partial z}\left(D_{e,i} r_c^2 \frac{\partial C_{c,i}}{\partial r_c}\right) + \rho_s \sum R_i, \quad (16)$$

$$((1-\varepsilon_c)\rho_s C_{p,s} + \varepsilon_c C_{p,c} C_{T,c})\frac{\partial T_c}{\partial t} = \frac{\lambda_s}{r_c^2}\frac{\partial}{\partial r}\left(r_c^2 \frac{\partial T_c}{\partial r_c}\right) + \rho_s \sum(-\Delta H_i) R_i, \quad (17)$$

where $\varepsilon_c$ is the porosity of the oxygen carrier, $C_{c,i}$ is the concentration of gas species i in the solid phase, $r_c$ is the oxygen carrier radial element, $D_{c,i}$ is the effective diffusion coefficient of species i, $\rho_s$ the density of the oxygen carrier, $R_i$ the sum of reactions of species i, $C_{p,s}$ the heat capacity of the solid, $\lambda_s$ the thermal conductivity of the oxygen carrier, and $\Delta H$ the heat of reaction.

The momentum balance assumes pseudo-steady state and uses the Ergun friction factor for gas flow through a packed tubular reactor:

$$\frac{dP}{dz} = \left(\frac{1-\varepsilon_b}{\varepsilon_b^3}\right)\left(\frac{\rho u_0^2}{D_p}\right)\left(\frac{150}{Re_p} + 1.75\right) \quad (18)$$

where P is the total pressure in the bed and $Re_p$ is the particle Reynolds number. More details on the model including the correlations for process parameters (e.g., heat capacities, diffusion coefficients, solid properties) can be found in Han et al. [L. Han et al., "Heterogeneous modeling of chemical-looping combustion. Part 1: Reactor model," *Chemical Engineering Science*, vol. 104, pp. 233-249, December 2013; L. Han et al., "Heterogeneous modeling of chemical-looping combustion. Part 2: Particle model," *Chemical Engineering Science*, vol. 113, pp. 116-128, July 2014].

ii. Boundary Conditions

Two valves are manipulated at the inlet and exit of each CLC reactor module to control the path and direction of the flow. Changes in the gaseous feed flow at each feed and exit port valve are assumed instantaneous (dead time or time lag for switching is considered negligible). The Danckwwerts boundary conditions are applied for each reactor module. The boundary conditions for the fluid phase are shown in Eqs. (19-22). These equations are applied to each reactor module, j in the CLC reactor trains.

$$\varepsilon_b D_{ax,i} \frac{\partial C_i}{\partial z}\Big|_{z'=0} = (F_i|_{z'=0} - F_{i,in}^j)/A_c, \quad (19)$$

-continued $$\varepsilon_b \lambda_{ax} \frac{\partial T}{\partial z}\Big|_{z'=0} = T|_{z'=0} C_{p,f}^i F_T^i - T_{in}^i C_{p,in}^i G_{T,in}^j / A_c, \quad (20)$$

$$\frac{\partial C_i}{\partial z}\Big|_{z'=L} = \frac{\partial T}{\partial z}\Big|_{z'=L} = 0, \quad (21)$$

$$P|_{z'=L} = P_{out}^j \quad (22)$$

and the boundary conditions for the solid phase are:

$$\frac{\partial C_{c,i}}{\partial r_c}\Big|_{r_c=0} = \frac{\partial T}{\partial r_c}\Big|_{r_c=0} = 0, \quad (23)$$

$$-D_{e,i}\frac{\partial C_{c,i}}{\partial r}\Big|_{R_P} = k_{c,i}(C_{c,i}|_{R_p} - C_i), \quad (24)$$

$$-\lambda_s \frac{\partial T_c}{\partial r}\Big|_{R_P} = h_f(T_c|_{R_p} - T), \quad (25)$$

In a CLC reactor train the inlet and outlet port valves are switched by a valve controlling scheme similar to that of FIG. 1. The $j^{th}$ fixed bed reactor is fed by either $CH_4$ or air, while the other reactors are fed by the exhaust of the reactor before them or after them. In nominal SMB mode, the fresh feed is sent to the ($j^{th}$+1) reactor when the reaction is completed in the $j^{th}$ reactor. Therefore, the feed is sent to each module sequentially and the train inlet and outlet move along the train in a cyclic manner. If the feed enters the train at the $j^{th}$ module, the gas exhaust exits at the ($j^{th}$−1) module, where j>1. These sequentially altering boundary conditions are written as:

$$u_{in}^j = u_{in}, \forall t \in (0, \tau_{stage}), j \in [1, n_{mod}], \quad (26)$$

$$u_{in}^{k+1-\zeta(k+1)} = u^{k-\zeta(k)}|_{z=L}, \quad (27)$$

$$\zeta(l) = \begin{cases} n_{mod} & \text{if } l > n_{mod} \\ 0 & \text{otherwise} \end{cases}, \forall k \in [j, j+n_{mod}-2],$$

$$u_{in}^{k+1-\zeta(k)} = u^{k+1-\zeta(k+1)}|_{z=L}, \quad (28)$$

$$\zeta(l) = \begin{cases} n_{mod} & \text{if } l > n_{mod} \\ 0 & \text{otherwise} \end{cases}, \forall k \in [j, j+n_{mod}-1],$$

where stage={RED (reduction), OX (oxidation), HR (heat removal), PU (purge)}, $u_{in}^j$ includes the temperature of feed gas $T_{in}^j$, the molar flow rate of the feed gas $F_{i,in}^j$, and the pressure $P_{in}^j$, $u^j|_{z=L}$ are the values of the same at the exit of reactor module j, while $u_{in}$ is defined by the reactor train boundary conditions, $T_{in}$, $F_{i,in}$, and $P_{in}$. The switch $\xi(l)$ resets the module counter to the first reactor module, when the exhaust of the last is to be used as feed for the first module. Eq. (27) is used for clockwise SMB operation, while Eq. (28) can be used when reversal of the order of modules is desired. In the latter case, the exhaust of the first reactor module is used as feed to the last and all other reactor modules are fed from the exhaust of the reactor module arranged after them (for the convention of clockwise reactor module counting).

iii. Problem Parameterization for Comparative Analysis of Modularized CLC Reactors The performance of CLC reactor trains was compared against an equivalent nominal fixed bed reactor. The focus here was to evaluate the concept of modularization, so the reactor diameter and total length were set to be the same for the reference fixed bed reactor and the reactor trains explored. The reactors were assumed to operate with $CH_4$ as the fuel source, and a synthetic oxygen carrier of supported NiO. Adánez et al. explored materials comprising 40-80 wt. % of Ni on $TiO_2$, and showed that these materials exhibit high reactivity, high conversion, stability and strength at temperatures higher than 1200° C. and up to 1300° C. This provides a good baseline for oxygen carrier materials that can be used at very high temperatures for intensified CLC-CC process analyses that focus on efficiency maximization. As mentioned, reduction and oxidation kinetics were adapted from Nordness et al., who experimentally studied high-pressure CLC of $CH_4$ and NiO in a fixed bed reactor. The reactor specifications and operating conditions shown in Table 2 were used for all the simulations. The total reactor length of the reactor train is the sum of the lengths of each reactor module and was set equal to that of the reference fixed bed reactor. The maximum allowed reactor temperature was set to 1300° C., and the operating pressure was bounded to 26 bar. The oxygen carrier active weight content was set to have an upper bound of 40%. The reactor train was allowed to reverse the flow direction, per Eq. (28), as this was shown beneficial in L. Han et al., "Chemical-looping combustion in a reverse-flow fixed bed reactor," Energy, vol. 102, pp. 669-681, May 2016. Inlet and outlet ports were set to switch simultaneously along the train during reduction and oxidation.

Early in the work associated with this disclosure it was demonstrated that there is benefit in allowing flow reversal for the oxidation and heat removal stages, so this was explored in a case study. A reactor train that only includes two reactor modules was studied to explore the concept. Then, the size of the train was increased to three modules and allowed flow reversal. In the following, more details on the case studies are provided and the major findings from the comparative analysis are disclosed by examining each case study at the TIT set-point of 1250° C. The allowable ranges of the design variables of Table 1 were as follows:

$100 \leq m_{ax}(kg/s) \leq 160$; $350 \leq m_{HR}(kg/s) \leq 470$; $430 \leq T_{in,ox}$ (° C.)$\leq 500$; $480 \leq T_{in,hr}$ (° C.)$\leq 550$; $650 \leq \tau_{red}(s) \leq 760$; $0 \leq [a, b](-) \leq 1$; and $20 \leq \omega(\%) \leq 40$.

In all the case studies discussed in the following sections the oxygen carrier active weight content, $\omega$, was found at the upper bound allowed, while the reduction stage time constant, $\tau_{red}$, was fixed to 230 s due to the scheduling pattern chosen for the CLC island.

TABLE 2

Design and operating variables of reference CLC fixed bed reactor.

| Parameters | values |
|---|---|
| OC Active weight content [wt. % NiO] | 40 |
| $CO_2$ capture efficiency [%] | 96 |
| Fuel conversion [%] | 98 |
| Particle diameter [mm] | 5 |
| Turbine Inlet Temperature (TIT) set-point [° C.] | 1250 |
| Total reactor length [m] | 9.4 |
| Reactor diameter [m] | 4.7 |
| Pressure drop [% bar] | 4 |
| $CH_4$ flow rate [kg/s] | 8.626 |
| Oxidation feed flow (Air) [kg/s] | 146 |
| Oxidation feed temperature [° C.] | 480 |
| Heat removal feed flow (Air) [kg/s] | 377.5 |
| Heat removal feed temperature [° C.] | 534 |
| Purge feed ($N_2$) [kg/s] | 9.4 |
| $\tau_{red}$ [s] | 730 |
| $\tau_{pu}$ [s] | 20 |
| $\tau_{ox}$ [s] | 1440 |
| $\tau_{hr}$ [s] | 2190 | iv. Case I: Network of Two Reactor Modules

Figure 3:
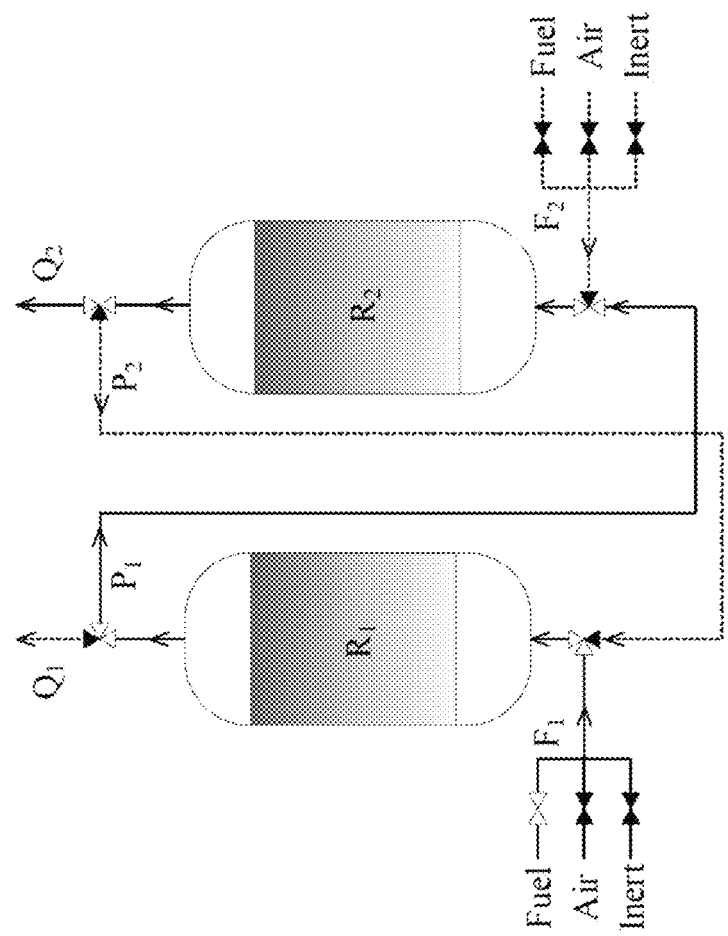
FIG. 3 is a diagram of an exemplary Case I that includes a CLC reactor train with two reactor modules operating in SMB mode.

As shown in FIG. 3, the number of reactor modules was set to $n_{mod}=2$, and each module was assumed to be identical. Therefore, the length of each module was set to 4.7 m, and the diameter was the same as that of the reference fixed bed (Table 2). The successive cycles of RED1, RED2, PU 1, OX1, OX2, HR, and PU 2 were achieved by manipulating the inlet and exit valves for the feed of fuel, air and inert gas. Specifically, oxidation and reduction stages were performed in a simulated moving bed pattern, whereas heat removal and purge were accomplished in the pattern of the reference fixed bed reactor (from the first reactor without valve manipulation.) During either reduction or oxidation, the gas was fed to the first reactor, $R_1$, and the gas flows through $F_1 \rightarrow R_1 \rightarrow P_1 \rightarrow R_2 \rightarrow Q_2$. Once the stage in $R_1$ is completed, the gas is fed to the second reactor, $R_2$, and the gas flows through $F_2 \rightarrow R_2 \rightarrow P_2 \rightarrow R_1 \rightarrow Q_1$. During heat removal or purge, the gas flows through $F_1 \rightarrow R_1 \rightarrow P_1 \rightarrow R_2 \rightarrow Q_2$. The objective of this case study was to provide insights on the effect of plain SMB operation during the reaction stages of reduction and oxidation.

v. Case II: Network of Three Fixed Bed Reactor Modules

Figure 4:
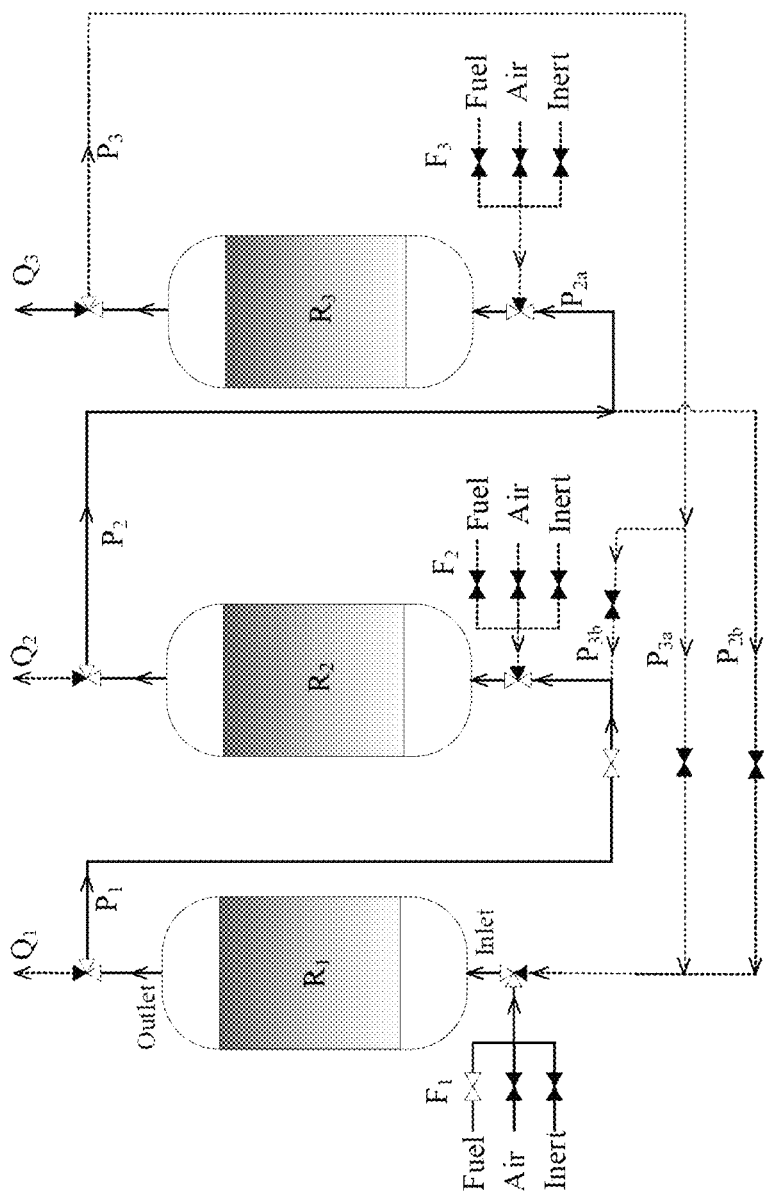
FIG. 4 is a diagram of an exemplary Case II that includes a CLC reactor train with three reactor modules operating in SMB mode during reduction and reverse module ordering during oxidation and heat removal.

In this case study, the number of reactor modules was increased to $n_{mod}=3$, with each reactor assumed to be identical. Therefore, the length of each module used was 3.13 m. A successive cycle in this case included RED1, RED2, RED3, PU1, OX, HR, and PU 2 by switching valves as shown in FIG. 4. Specifically, it was found best to operate the modules on SMB pattern during reduction, but reverse the module ordering during oxidation and heat removal. During the first reduction stage, RED1, $CH_4$ flows through $F_1 \rightarrow R_1 \rightarrow P_1 \rightarrow R_2 \rightarrow P_2 \rightarrow P_{2a} \rightarrow R_3 \rightarrow Q_3$. Once RED1 is finished, the fuel flows through $F_2 \rightarrow R_2 \rightarrow P_2 \rightarrow P_{2a} \rightarrow R_3 \rightarrow P_3 \rightarrow P_{3a} \rightarrow R_1 \rightarrow Q_1$ for the second reduction stage. During the following reduction stage, RED3, the fuel flows through $F_3 \rightarrow R_3 \rightarrow P_3 \rightarrow P_{3a} \rightarrow R_1 \rightarrow P_1 \rightarrow R_2 \rightarrow Q_2$. For the oxidation stage, the order of the reactor modules is reversed by feeding $R_3$ first, then the exhaust of $R_3$ flows through $R_2$ to $R_1$: $F_3 \rightarrow R_3 \rightarrow P_3 \rightarrow P_{3b} \rightarrow R_2 \rightarrow P_2 \rightarrow P_{2b} \rightarrow R_1 \rightarrow Q_1$. During heat removal, the gas flows through the same pattern with that of the oxidation stage, namely $F_3 \rightarrow R_3 \rightarrow P_3 \rightarrow P_{3b} \rightarrow R_2 \rightarrow P_2 \rightarrow P_{2b} \rightarrow R_1 \rightarrow Q_1$. There was no benefit observed in operating in SMB model during oxidation and heat removal, as the management of the heat front while satisfying process constraints was quite challenging.

vi. Results and Discussion

First, the performance of the modular reactor systems in terms of oxygen carrier conversion, temperature and carbon solid formation were evaluated. The reactor modules were analyzed at cyclic steady-state conditions, which refer to conditions of the entire CLC train repeating identical output profiles over successive redox cycles. Typically, cyclic steady state is achieved after at least three redox cycles. Solution of Eq. (13) subject to constraints of Eqs. (3)-(12) with the models of Eqs. (14)-(18), subject to the constraints of Eqs. (19)-(25) and the switching constraints of Eqs. (26-28) resulted in the values for the strategy and manipulated variables summarized in Table 3 for the reference fixed bed, the reactor train of Case I, and that of Case II.

TABLE 3

Optimized strategy and operating conditions for the normal fixed bed, network of two reactors, and network of three reactors with NiO based oxygen carriers.

| Parameters | Ref | Case I | Case II |
|---|---|---|---|
| $n_{mod}$ | 1 | 2 | 3 |
| Oxidation feed flow (Air) [kg/s] | 146 | 146 | 133 |
| Oxidation feed temperature [° C.] | 480 | 480 | 480 |
| Heat removal feed flow (Air) [kg/s] | 377.5 | 454.8 | 409.8 |
| Heat removal feed temperature [° C.] | 534 | 534 | 545 |
| a | — | [0.5, 0.5] | [0.2, 0.3, 0.5] |
| b | — | [0.5, 0.5] | [0.0, 0.0, 1.0] |
| $RED_1$ modules order | — | $F_1 \to R_1 \to R_2 \to Q_2$ | $F_1 \to R_1 \to R_2 \to R_3 \to Q_3$ |
| $RED_2$ modules order | — | $F_2 \to R_2 \to R_1 \to Q_1$ | $F_2 \to R_2 \to R_3 \to R_1 \to Q_1$ |
| $RED_3$ modules order | — | — | $F_3 \to R_3 \to R_1 \to R_2 \to Q_2$ |
| $OX_1$ modules order | — | $F_1 \to R_1 \to R_2 \to Q_2$ | $F_3 \to R_3 \to R_2 \to R_1 \to Q_1$ |
| $OX_2$ modules order | — | $F_2 \to R_2 \to R_1 \to Q_1$ | — |
| HR modules order | — | $F_1 \to R_1 \to R_2 \to Q_2$ | $F_3 \to R_3 \to R_2 \to R_1 \to Q_1$ |
| PU modules order | — | $F_1 \to R_1 \to R_2 \to Q_2$ | $F_3 \to R_3 \to R_2 \to R_1 \to Q_1$ | vii. Comparison of Bed Temperature, Conversion and Carbon Formation

Figure 5A:
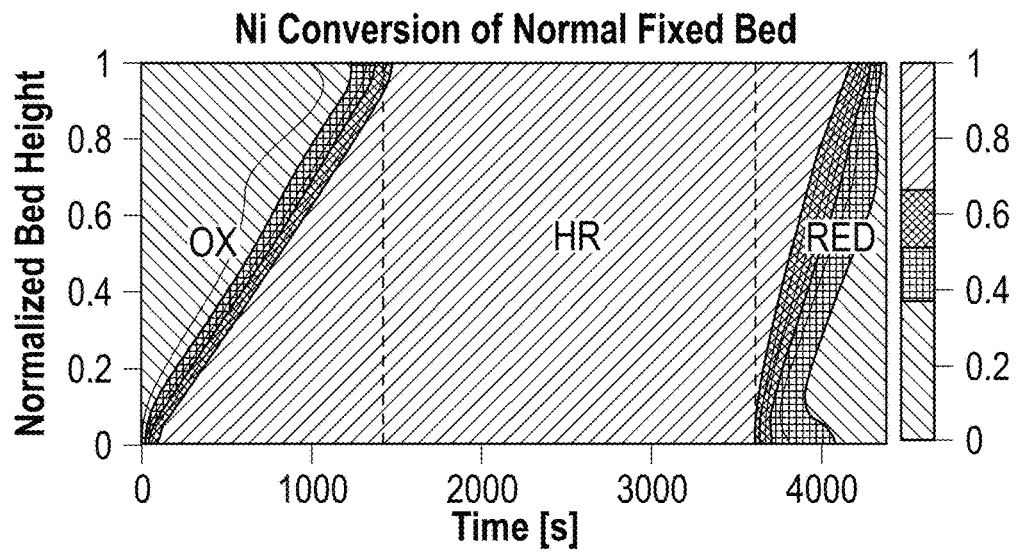
FIGS. 5A-5F provide a series of profiles of oxygen carrier conversion and temperature in the reference fixed bed and the reactor trains of Cases I and II. Conversion "0" refers to Ni and "1" refers to NiO. Bed height has been normalized to that of the reference fixed bed reactor, so that the height of reactor Rj in the reactor trains is mapped to the equivalent height of the reference fixed bed. The individual profiles are as follows.
Figure 5B:
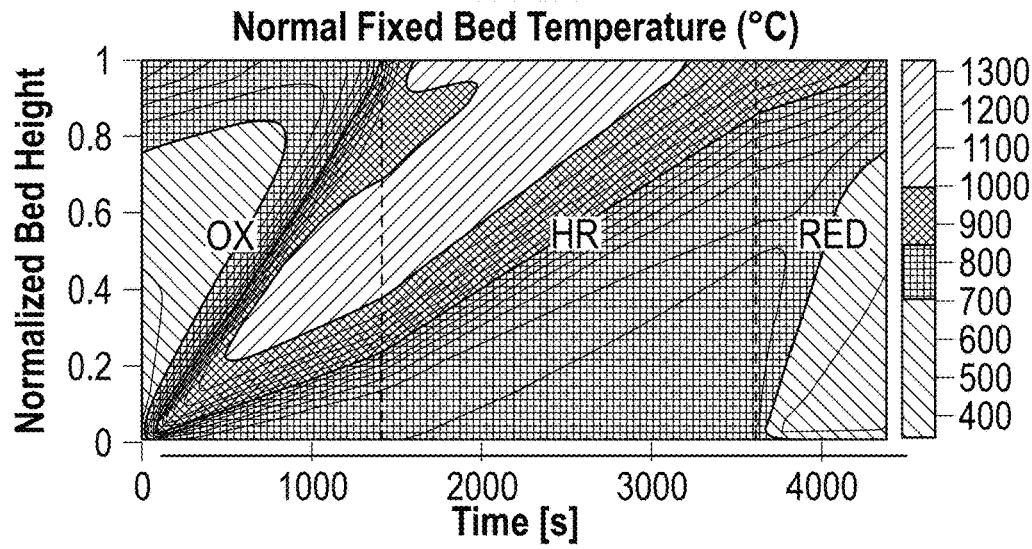

FIGS. 5A-5F present the reactor performance metrics of the three cases studied, in terms of spatial and temporal bed conversion and bed temperature. In the reference fixed bed, FIGS. 5A and 5B, as air is fed to the reactor during oxidation, the reaction and temperature fronts travel axially through the bed, converting Ni to NiO (FIG. 5A), while increasing the bed temperature (FIG. 5B). At the end of oxidation, the bed is fully oxidized, and much of the heat produced from the oxidation stage is still retained in the bed, as shown in FIG. 5B. Subsequently, air is fed to the reactor to transfer the heat stored in the solids, to the gases during the heat removal stage. The heat produced from oxidation near the reactor exit is the first to be pushed out of the bed, followed by the heat from the interior and inlet regions of the bed. During the reduction stage, $CH_4$ is fed to the reactor to reduce the oxidized oxygen carrier, and a reaction front is formed and moves in the axial direction through the reactor reducing the bed. As shown in the reduction stage of FIG. 5A, the inlet of the normal fixed bed reactor is first reduced, followed by the interior and exit regions of the bed, due to the progression of the reaction front. The initial axial temperature gradients (at the commencement of reduction) in FIG. 5B are due to the temperature profiles inherited from the previous oxidation and purge steps. The reduction reactions are overall endothermic, therefore, the bed temperature decreases. A cold heat front is formed at the inlet of the reactor and moves through the bed (FIG. 5B). Once the entrance of the reactor is cooled to the temperature of the feed gas, the reduction of the oxygen carrier in the entrance zone of the reactor stops. The reduction is forced to stop before the complete conversion of NiO to Ni, to satisfy the requirements for high fuel conversion (>98%) and $CO_2$ capture efficiency (≥% 96).

Figure 5C:
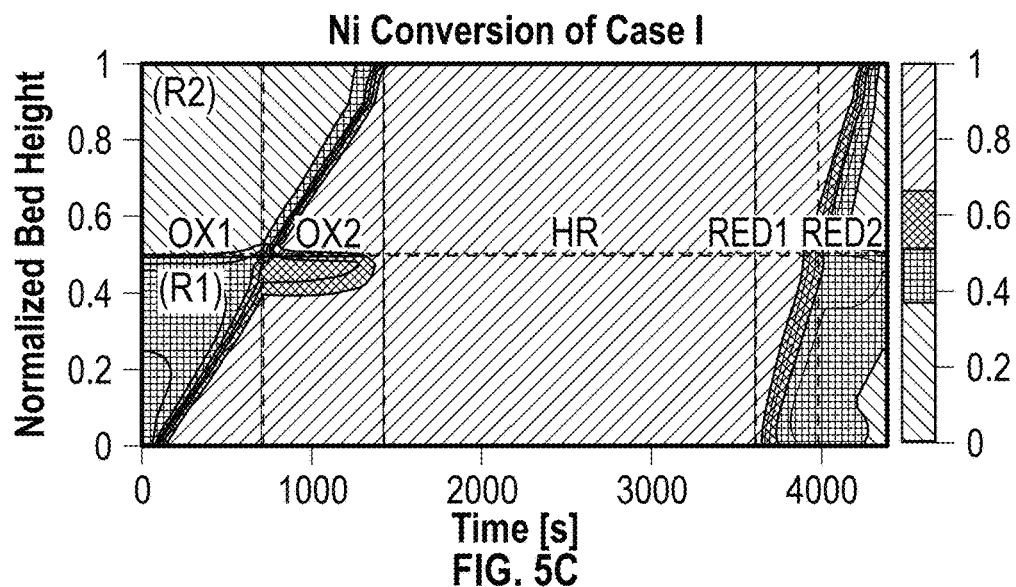
Figure 5D:
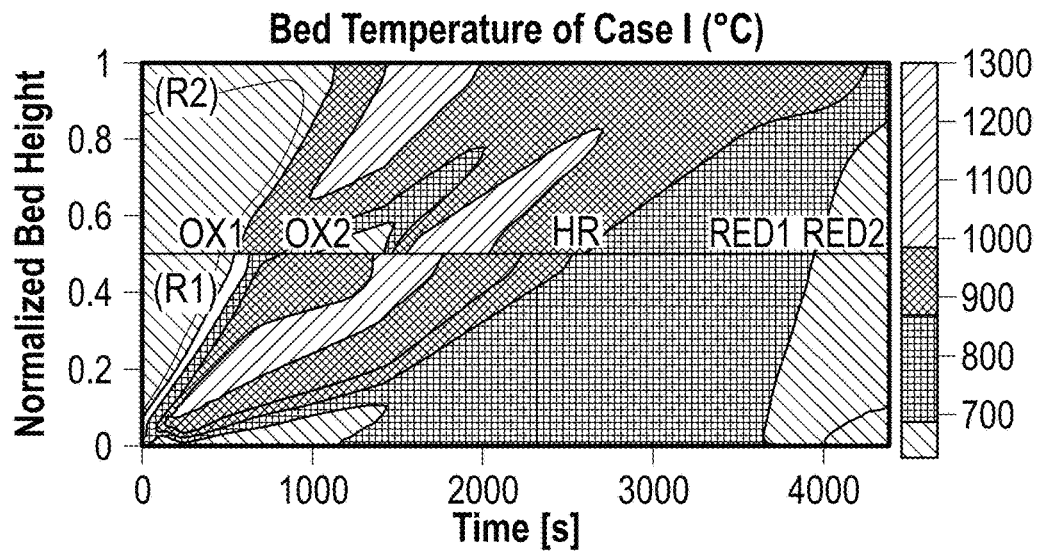

FIGS. 5C and 5D show the performance of the modularized system with two fixed bed reactor modules. The interval coefficients were found optimal at values of $a_1$=0.5 and $a_2$=0.5, and $b_1$=0.5 and $b_2$=0.5. The reduction stage was split into RED1 and RED2 of equal time intervals, and the oxidation stage was also split into OX1 and OX2 of equal time intervals. The height of bed shown in FIGS. 5C and 5D is normalized by the height of the normal fixed bed, so that the inlet port of $R_1$ is at height of 0, and the inlet port of $R_2$ is at height of 0.5. During oxidation, the bed temperature increases due to the exothermic oxidation reactions. Stage OX1 stops before the oxygen carrier in $R_1$ is fully oxidized, and oxygen in the exhaust from the OX2 stage is sent back to $R_1$. At the end of OX2, the oxygen carrier in $R_1$ and $R_2$ is fully oxidized, as shown in FIG. 5C. The temperature profile of $R_1$ in OX1 and that of $R_2$ in OX2, shown in FIG. 5D, are similar to those of FIG. 5B.

During the second oxidation stage, OX2, fresh air is fed to $R_2$ so the temperature of its entrance is lower. The heat produced from the oxidation in $R_1$ is pushed out by the exhaust of $R_1$, therefore the temperature of gases exiting the train is high. The heat fronts formed in $R_1$ and $R_2$ are pushed out of the reactor train during heat removal stage. The train is fed at the entrance of $R_1$ only and the heat travels through both reactor modules. During RED1, $CH_4$ is first fed to $R_1$, the bed is reduced and the temperature gradients from previous heat removal and purge stages are pushed out. RED1 is stopped before the bed is completely reduced, and $CH_4$ is fed to $R_2$ by switching the valves. Some of the residual heat near the exit of $R_2$ is pushed to the entrance of $R_1$.

Figure 5E:
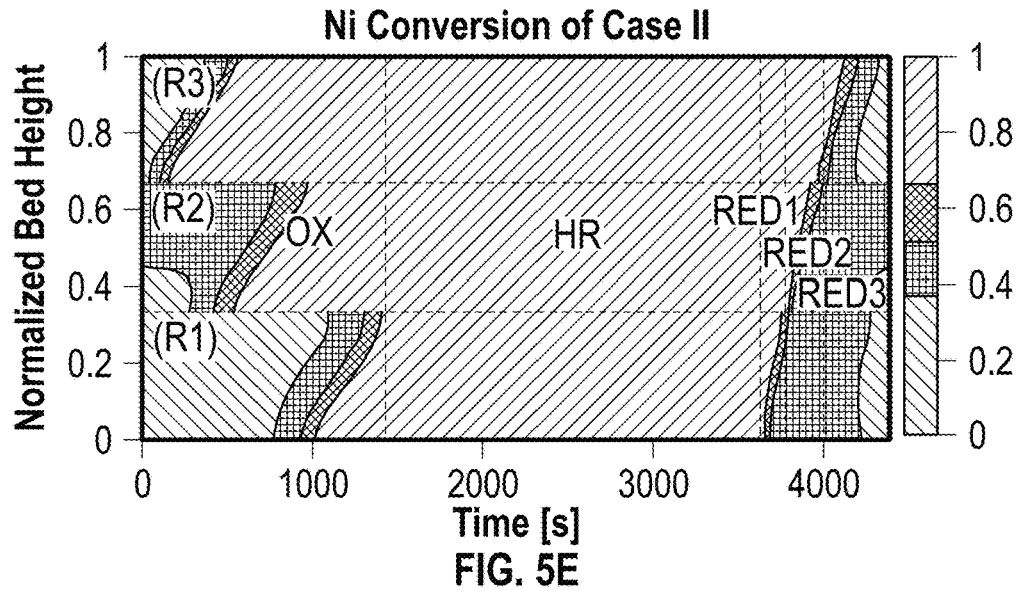
Figure 5F:
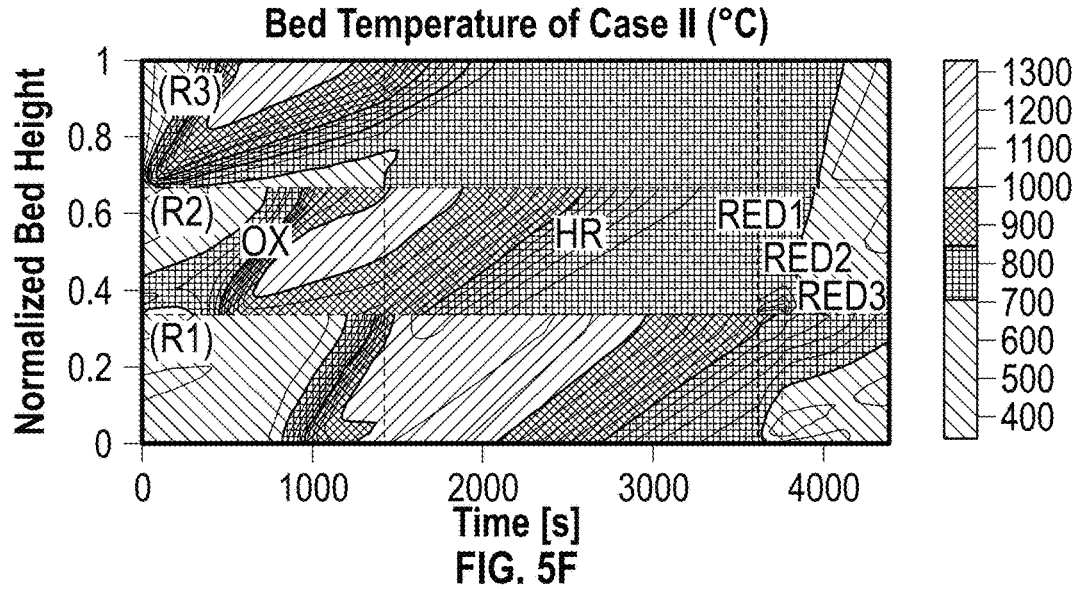

FIGS. 5E and 5F show the performance of a CLC reactor train with three fixed bed reactor modules. During the oxidation and heat removal stages, the feed was sent to the inlet of $R_3$ with exhaust gas coming out the top of $R_1$. Specifically, air was first fed to the third reactor, $R_3$, then the second reactor, $R_2$, and finally the first reactor, $R_1$, as shown in FIG. 4. The oxidation of Ni first occurs at the inlet of $R_3$ and increases the temperature near the bed entrance. The remaining O2 in the exhaust of $R_3$ (if any), oxidizes Ni to NiO in $R_2$, then $R_1$, as shown in FIG. 5E. The temperature front formed in $R_3$ during oxidation is inherited by $R_2$, and the temperature in $R_2$ is further increased due to the oxidation in $R_2$ with the remaining $O_2$ from the exhaust of $R_3$, as shown in FIG. 5F. At the early stages of oxidation the first reactor to consume $O_2$ is $R_2$ because of the higher temperature gradient it inherited from the previous reduction step. At the end of the oxidation stage, Ni in all reactors is completely oxidized to NiO (FIG. 5E), and the temperature of gas at the exit of $R_1$ is increased to around the set point of TIT (FIG. 5F). During heat removal, the heat stored in the solids in the three reactors is first pushed out of $R_3$ to $R_2$, and then to $R_1$, as shown in FIG. 5E. During reduction, $CH_4$ is first sent to $R_1$, then $R_2$, and finally $R_3$ by switching the valves of the inlet and outlet ports. In this case, the optimal time intervals are $a_1$=0.2, $a_2$=0.3, and $a_3$=0.5, for reduction stages RED1, RED2, and RED3, respectively. The bed with fully oxidized oxygen carrier is first reduced, as shown in RED1 of FIG. 5E. The diminishing temperature gradients at the start of RED1 (FIG. 5F) is the result of the prior heat removal stage. A cold heat front travels through $R_1$, $R_2$, and $R_3$ as endothermic reactions occur. After RED1 stops, inlet and outlet ports are switched, and $CH_4$ is fed to the inlet of $R_2$. Eventually, $CH_4$ is fed to the inlet of $R_3$. When the entire train is reduced, the reduction stage stops.

Figure 6A:
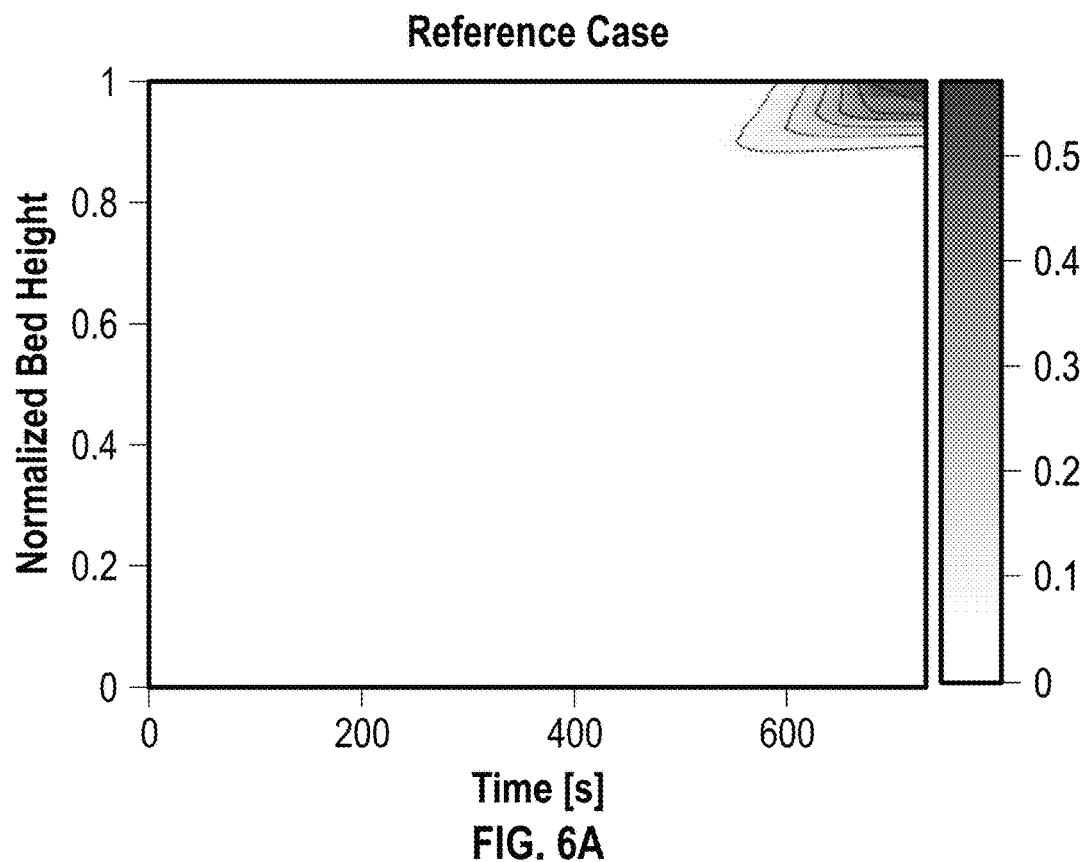
FIGS. 6A-6C show solid carbon formation on the reduced oxygen carrier (g C/kg OC, as follows.
Figure 6B:
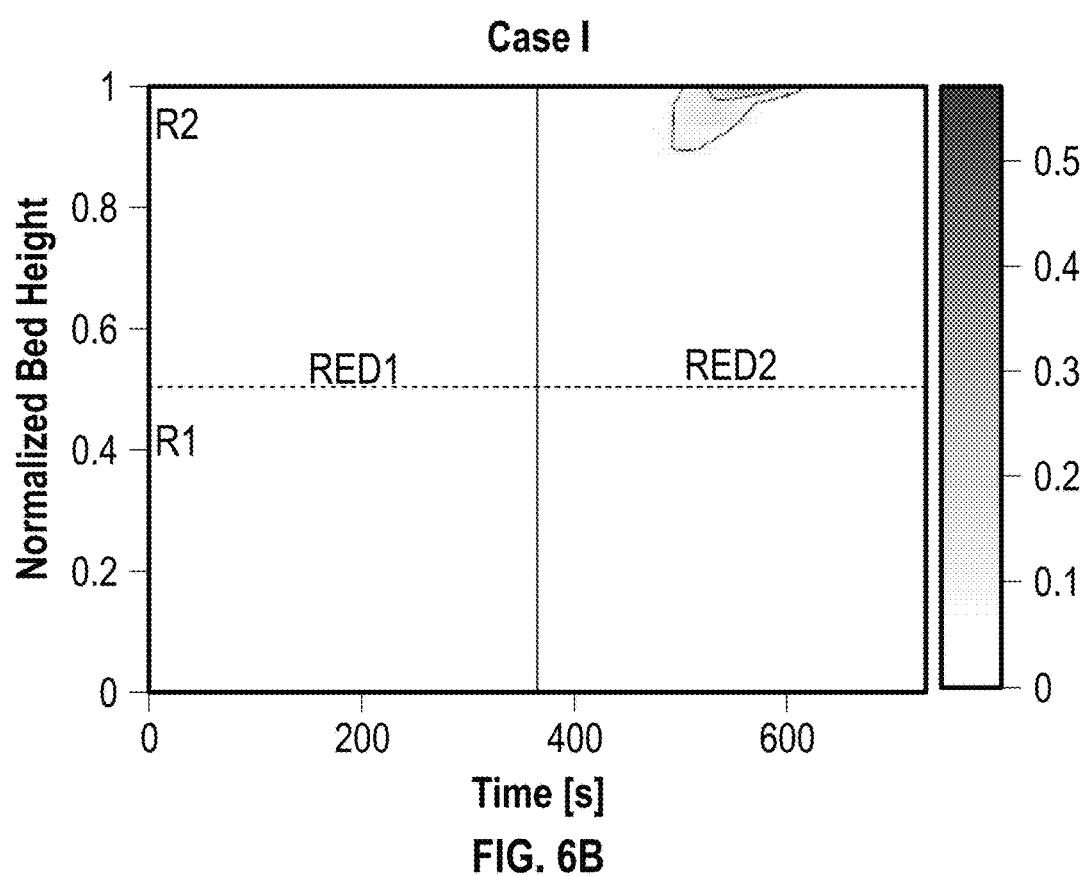
Figure 6C:
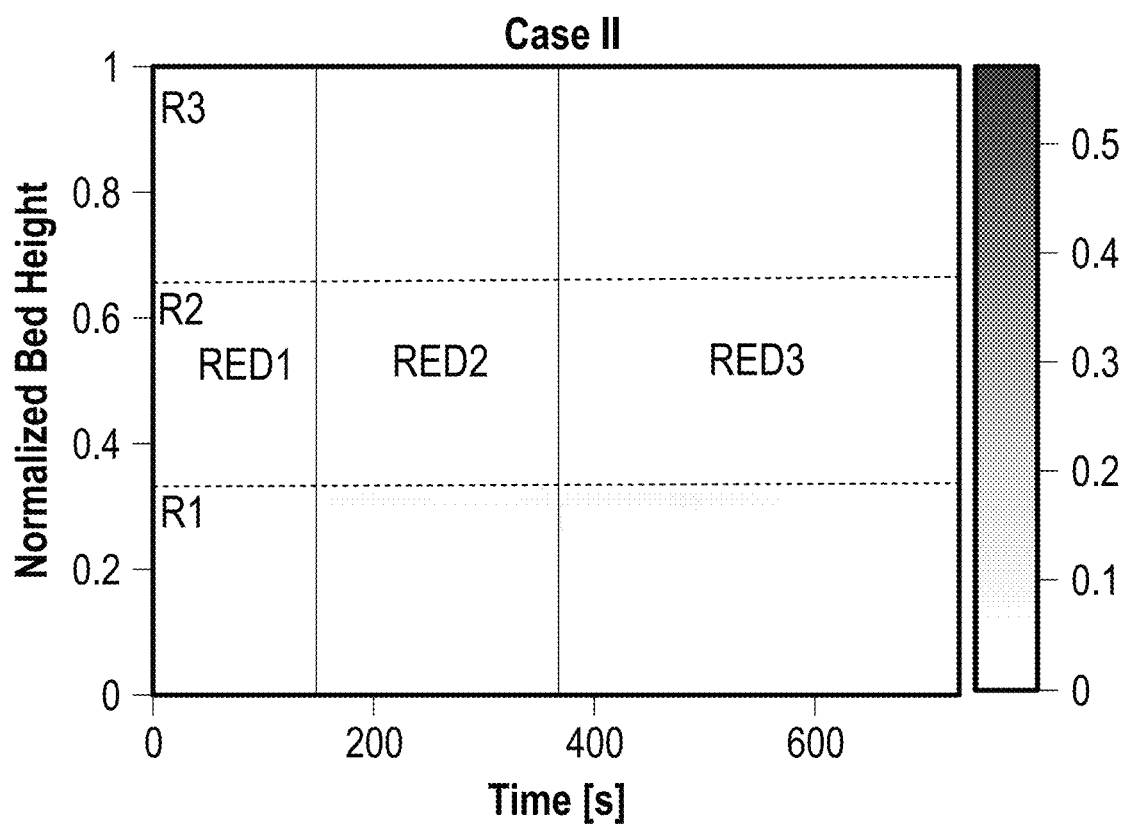

Comparison of FIGS. 5A and 5B with 5E shows that the overall conversion of oxygen carrier is similar, while the bed conversion is more dispersed across the normalized bed height for Case II. Intense temperature and conversion gradients are not desirable as they can lead to unwanted reactions. FIGS. 6A-6C show the solid carbon formation during the reduction stage. Solid carbon is formed on the reduced oxygen carrier and its formation is kinetically favored at the bed region with higher temperature. The carbon deposition profiles shown in FIGS. 6A-6C are to a great extent the result of the temperature profiles shown in FIGS. 5B-5F. Less carbon is accumulated in the modularized train with three reactor modules than in the reference fixed bed and Case I configurations. Specifically, the maximum carbon formation on the oxygen carrier of the reference, Case I and Case II were 0.573 gC/kgNi, 0.257 gC/kgNi, and 0.096 gC/kgNi, respectively. Modularization and flow reversal in the reactor leads to enhanced contact between the fuel and fresh oxygen carrier, suppression of undesired catalytic reactions, improvement in $CO_2$ selectivity, and suppression of carbon formation. This is further illustrated in the following section.

b. Comparison of Exit Gas Temperature, Enthalpy, and Composition

Figure 7A:
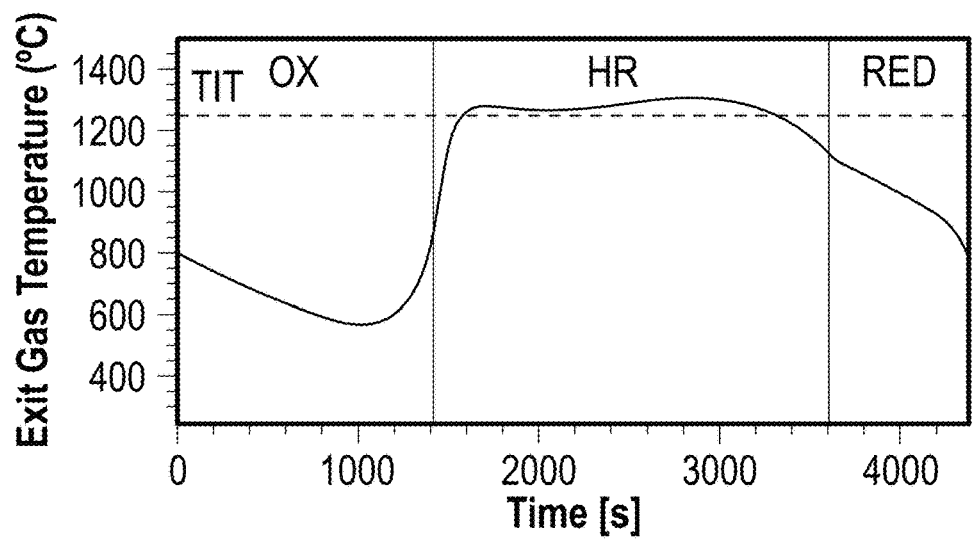
FIG. 7A—reference fixed bed reactor—temperature
FIG. 7B—reference fixed bed reactor—enthalpy
FIG. 7C—reference fixed bed reactor—composition
FIG. 7D—reactor train of Case I with two reactor modules—temperature
FIG. 7E—reactor train of Case I with two reactor modules—enthalpy
FIG. 7F—reactor train of Case I with two reactor modules—composition
FIG. 7G—reactor train of Case II with three reactor modules—temperature
FIG. 7H—reactor train of Case II with three reactor modules—enthalpy
FIG. 7I—reactor train of Case II with three reactor modules—composition
FIGS. 8A-8F provide plots relative to the performance, as follows.
Figure 7B:
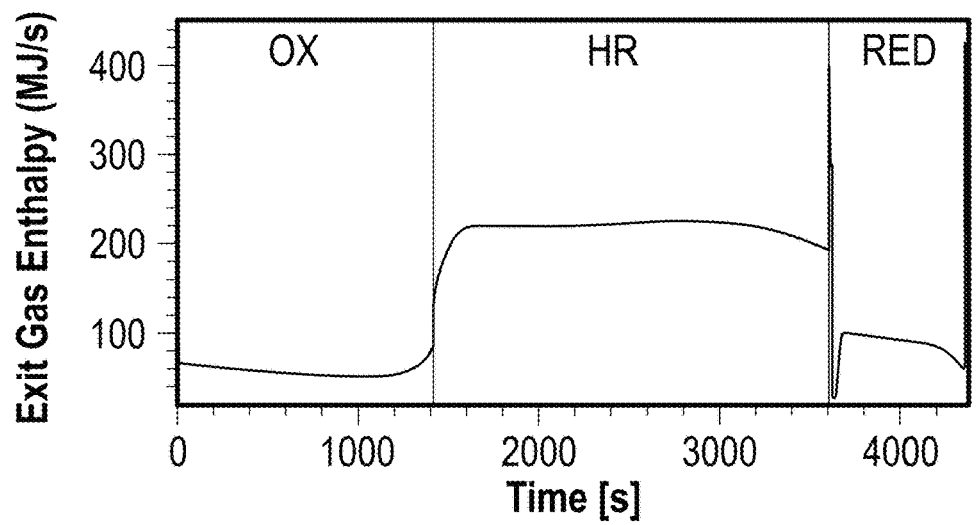
Figure 7C:
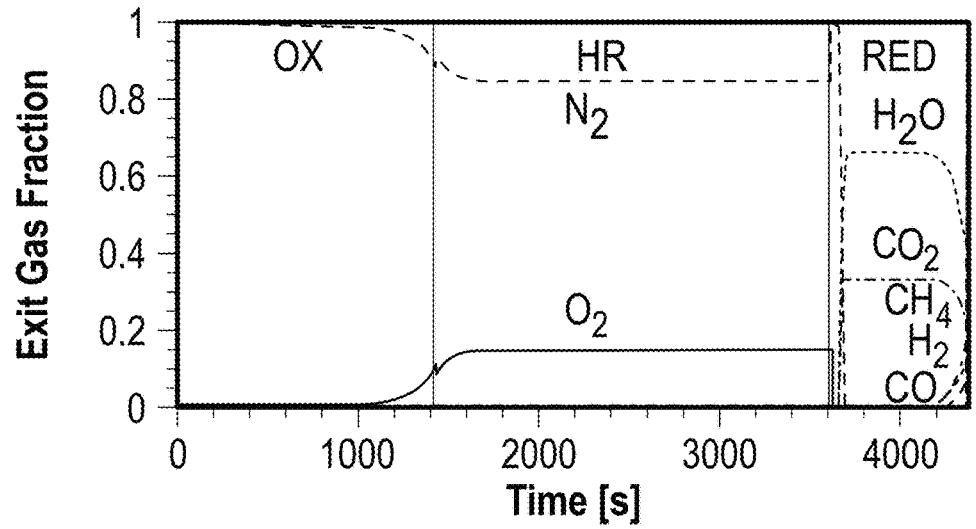
Figure 7D:
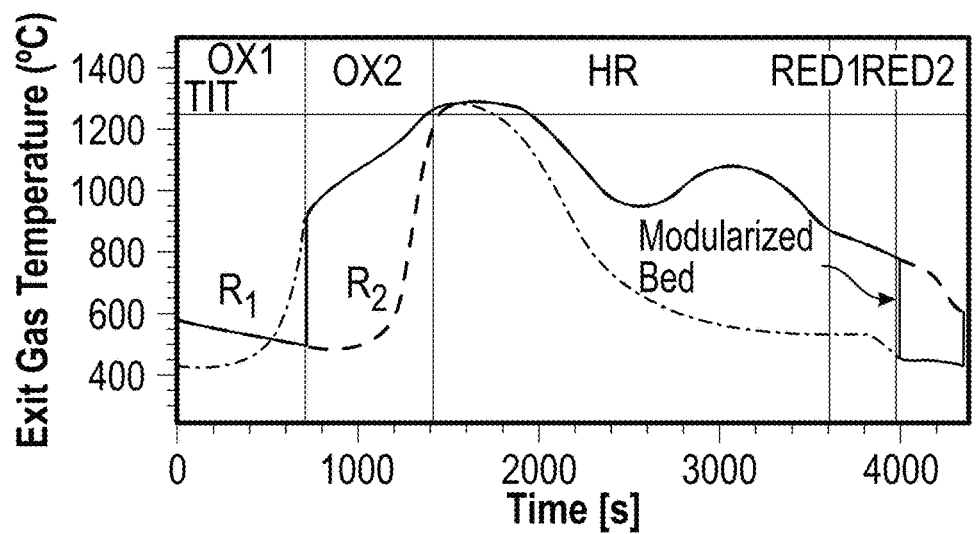
Figure 7E:
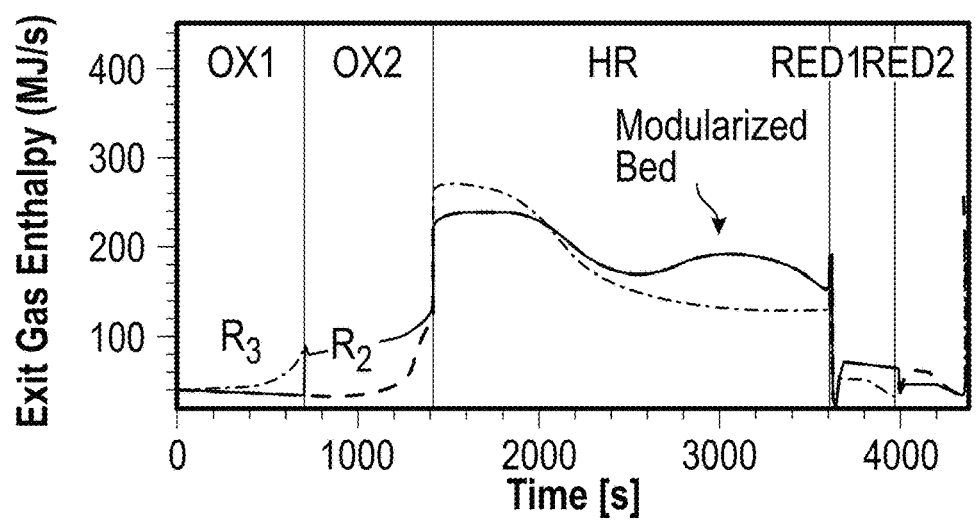
Figure 7F:
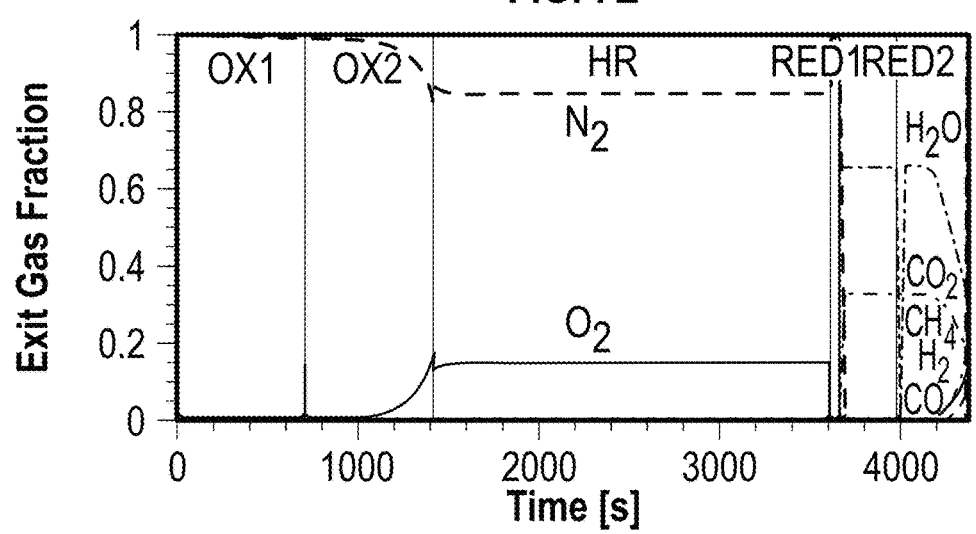
Figure 7G:
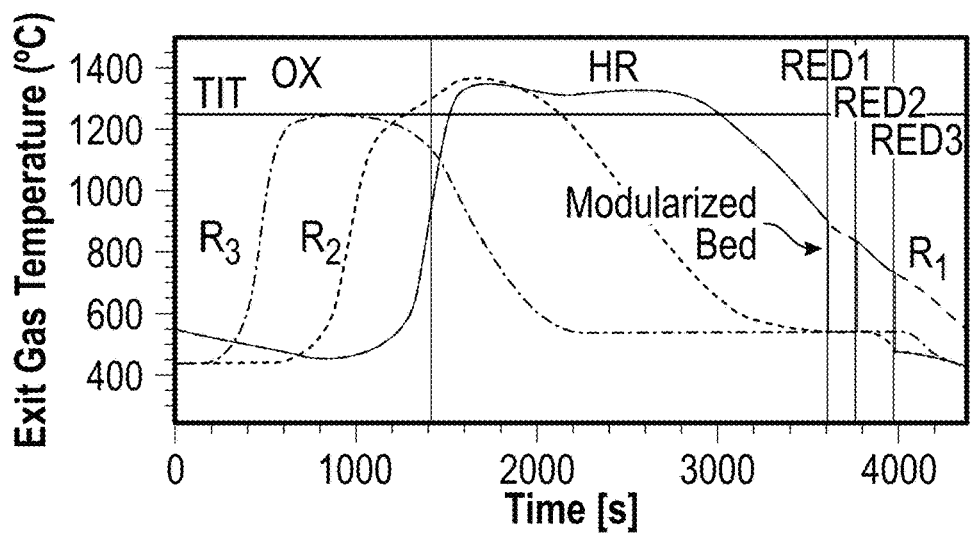
Figure 7H:
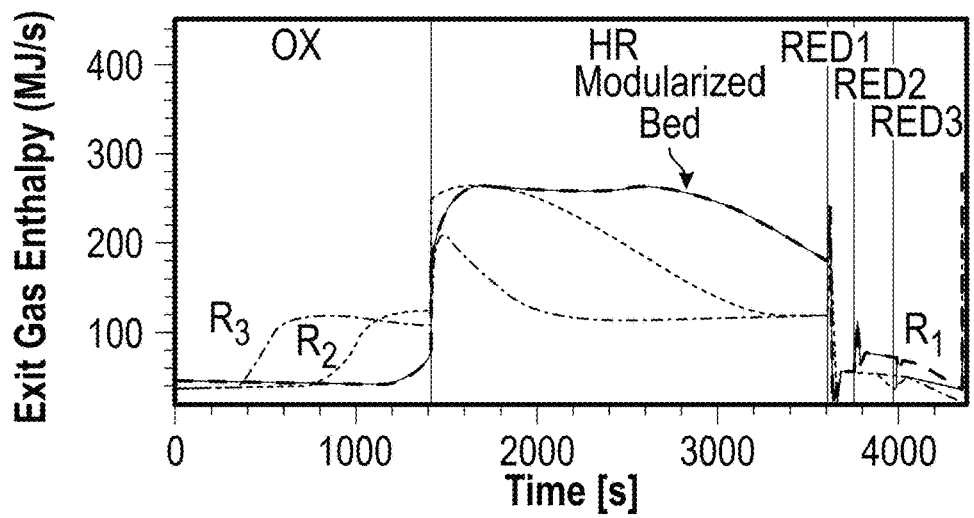

FIGS. 7A-7I show the exit gas temperature, enthalpy and composition profiles of the reference fixed bed reactor, the train with two reactor modules, and that with three reactor modules. The temperature and enthalpy of each individual module are also presented, to aid the discussion. During oxidation (FIGS. 7A and 7G), and OX1 (FIG. 7D), the gas initially leaving the reactors is at similar temperature to the reduction exhaust, because the cold front developed inside the reactor and the residual heat from the previous reduction cycle are being pushed out. Quickly after, the temperature of gas exiting the reactors rises, when the exothermic heat front from the oxidation reaches the exit of the reactor. As shown in FIG. 7D, the exit gas temperature in OX2 of Case I is higher than that of the reference case and Case II. The temperature at the commencement of HR shown in FIGS. 7A and 7G is similar, since the oxidation heat was pushed near the reactor exit and no SMB pattern was deployed in these cases. The comparison of enthalpy profiles during oxidation shows that the exit gas enthalpy of Case I during OX1 and that of Case II during OX are lower than that of the reference case, whereas the exit gas enthalpy of Case I during OX2 was higher (FIGS. 7B, 7E, and 7H). This is a result of the bed temperature profiles in each case. Moreover, a lower gas mass flow rate was found optimal for the oxidation stage of Case II, as presented in Table 3. The exit gas profiles of FIGS. 7C, 7F and 7I confirm complete bed oxidation in all cases.

During heat removal, the exit gas temperature of the reference case and Case II (FIGS. 7A and 7G) were comparable and relatively stable around the set point of TIT. The exit gas temperature of Case I during HR (FIG. 7D) is much lower and unstable. The exit gas temperature of Case I during HR is oscillating and deviates from the set point of TIT, due to the higher flow rate of air fed to the reactor train and the significant gradients in residual heat in $R_1$ and $R_2$ that are pushed out. Compared with the enthalpy profile of the reference case, Case II exhibits higher exit gas enthalpy, due to the higher flow rate of air a stream of air and slightly higher temperature during heat removal. This improvement in exit gas enthalpy leads to higher energy efficiency as defined by Eq. (1), and therefore higher power generation by the gas turbine of a CC power plant.

Figure 7I:
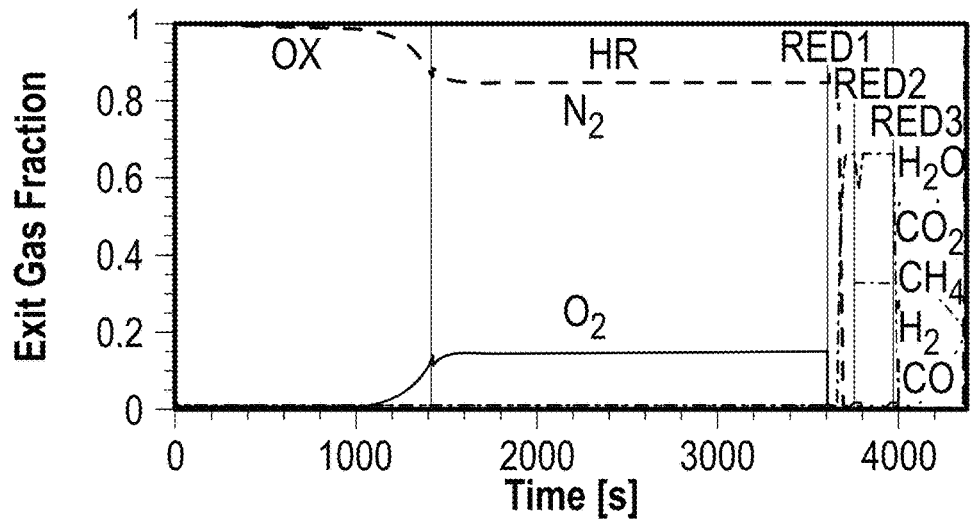
Figure 8A:
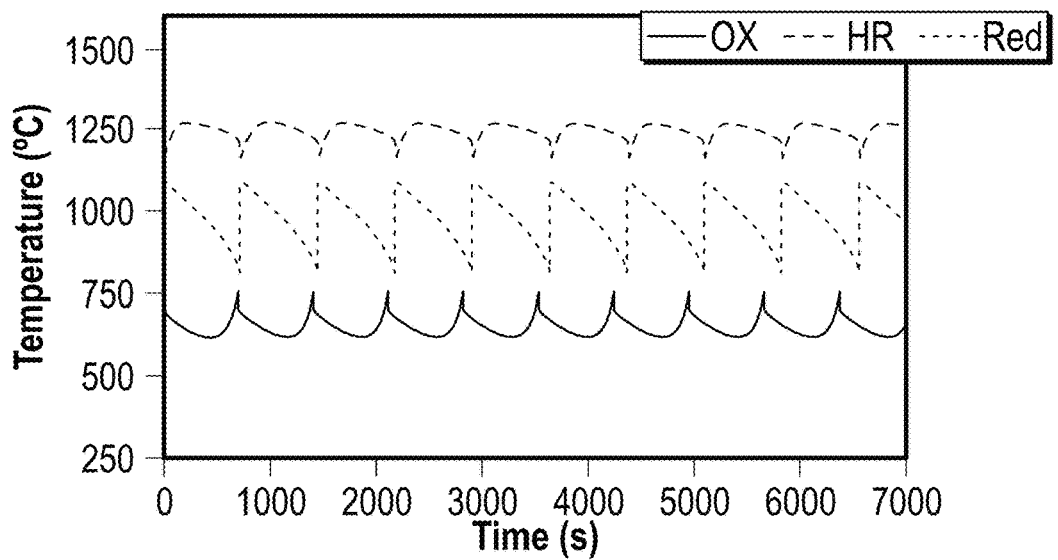
FIG. 8A shows performance in terms of exit gas temperature for the reference CLC island
Figure 8B:
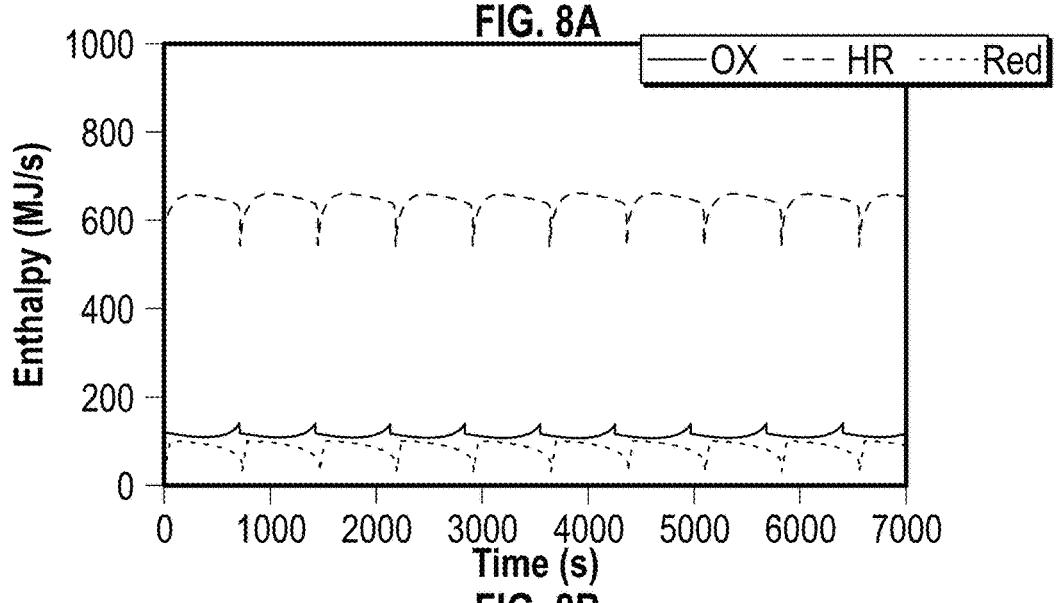
FIG. 8B shows performance in terms of enthalpy for the reference CLC island
Figure 8C:
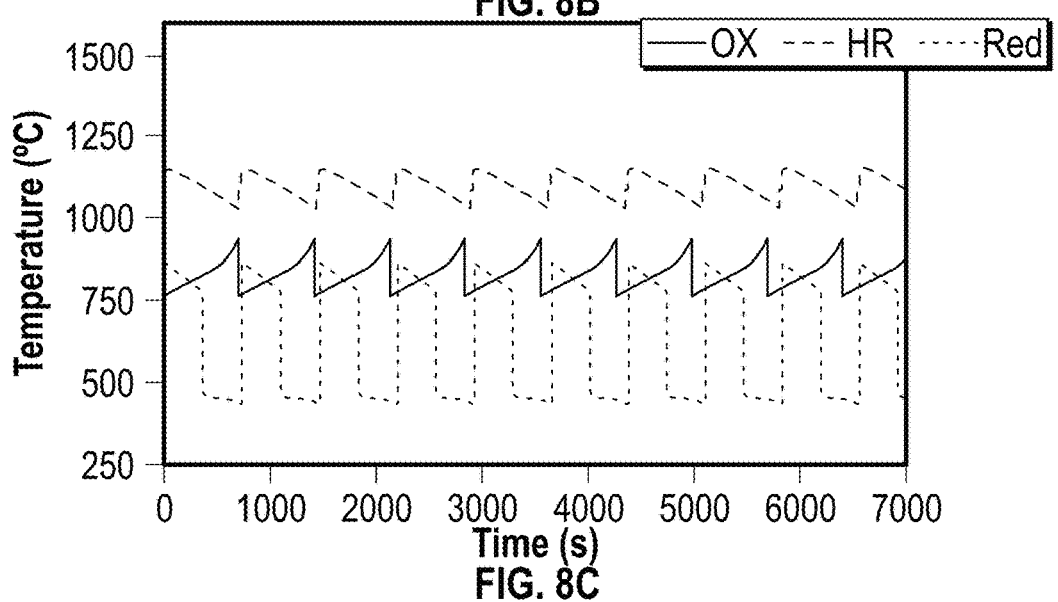
FIG. 8C shows performance in terms of exit gas temperature for Case I
Figure 8D:
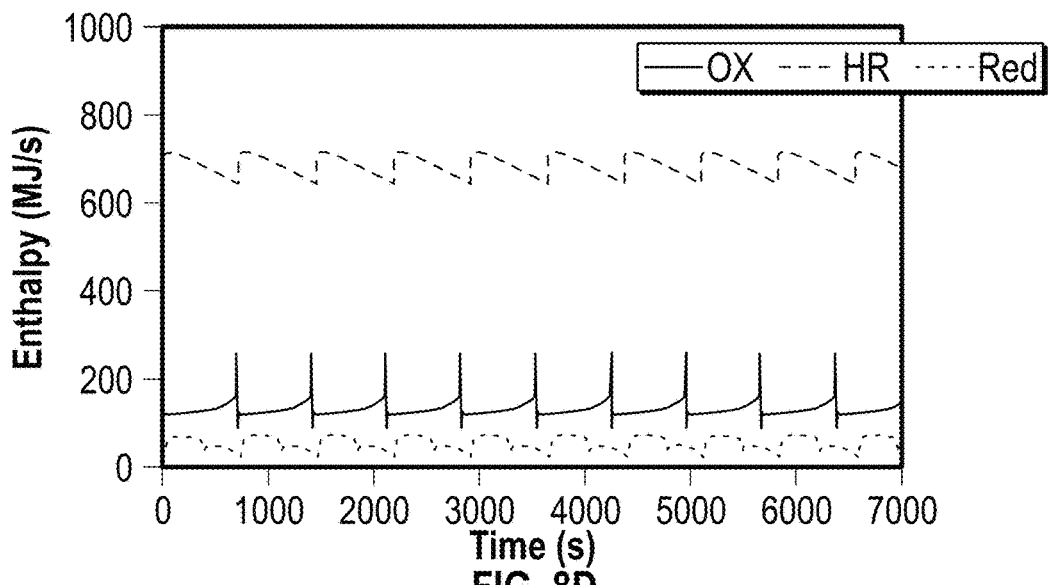
FIG. 8D shows performance in terms of enthalpy for Case I
Figure 8E:
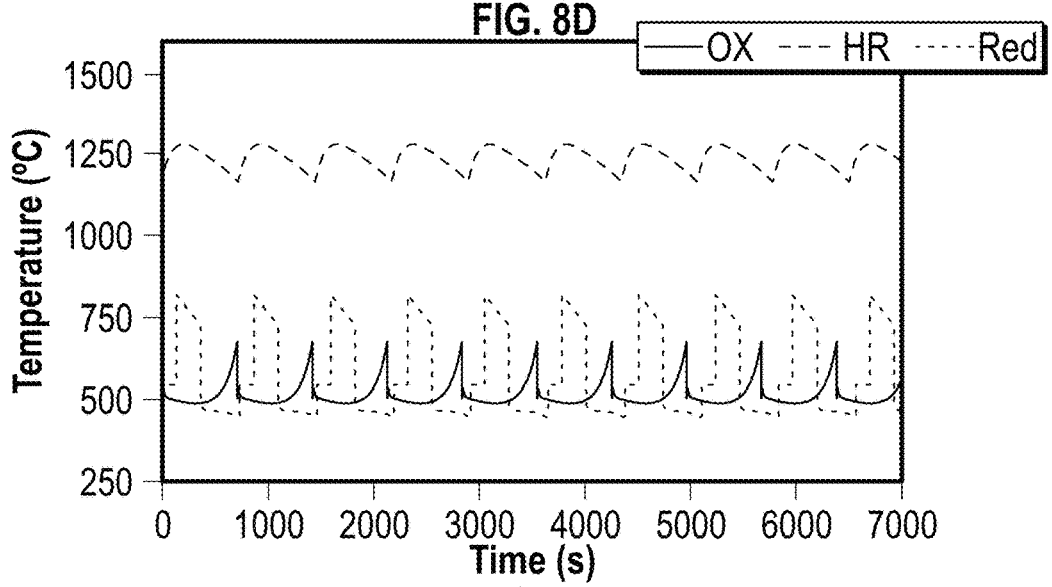
FIG. 8E shows performance in terms of exit gas temperature for Case II
Figure 8F:
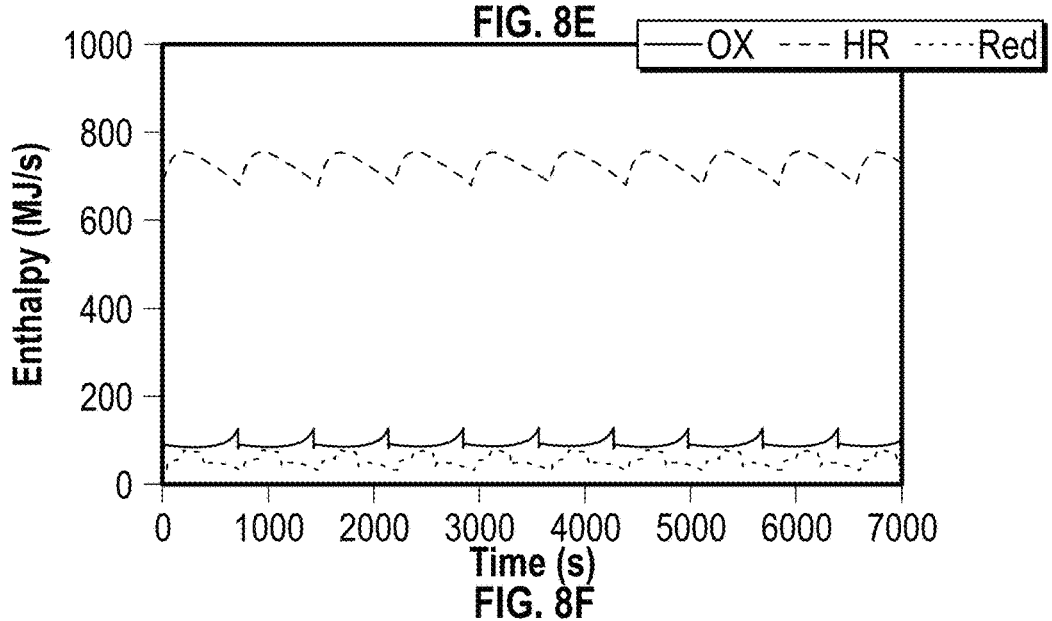
FIG. 8F shows performance in terms of enthalpy for Case II

During reduction in the reference fixed bed, the exit gas temperature decreases, FIG. 7A, due to the endothermic reduction reactions. As shown in FIG. 7D, the exit gas temperature in Case I during RED1 is higher than that during RED2, because the heat of $R_2$ is transferred to $R_1$, while the reduction reactions are endothermic. As shown in FIG. 7G, the exit gas temperature in Case II during RED1 and RED3 is relatively low. The gas exits from the outlet of $R_3$ during RED1, and the gas exits from the outlet of $R_2$ during RED3, while reactors $R_3$ and $R_2$ were the first and the second to undergo heat removal, respectively. Thus, $R_3$ and $R_2$ were cooled by the air fed at the HR stage and the heat of these two reactors was pushed out early, as shown in FIG. 5F. During RED2, the gas exits from the outlet of $R_1$, in which the temperature gradient was inherited from the previous heat removal stage. The profiles of exit gas enthalpy shown in FIGS. 7B, 7E and 7H match the temperature profiles shown in FIGS. 7A, 7D and 7G. During reduction, $CH_4$ was oxidized into $CO_2$ and $H_2O$, as shown in FIGS. 7C, 7F and 7I. Reduction of NiO was stopped before the release of unconverted gases ($CH_4$, $H_2$ and CO) became significant, satisfying the constraints of $CH_4$ conversion and $CO_2$ capture efficiency. All the cases studied achieved similar fuel conversion and $CO_2$ capture efficiency with emissions to CO below 3%.

c. Comparison of System Performance of the CLC Island with Reference Fixed Bed Reactors and that with CLC Reactor Trains with Two and Three Reactor Modules The overall system performance for the reference reactor and the reactor trains of Cases I and II was compared in terms of the energy efficiency of the heat removal step (defined in Eq. (1)), the mean exit gas temperature of the heat removal stage of each CLC reactor train, $\overline{T}_{HR}$, the mean temperature of the HR exhaust of the CLC reactor island fed to the bottoming gas turbine ($\overline{TIT}$), the standard deviation of the exhaust gas temperature during heat removal ($\sigma_{HR}$), and the standard deviation of the island HR exhaust to the bottoming gas turbines, ($\sigma_{TIT}$). Scheduling of the CLC reactor trains was driven by the need of continuous operation, which for the CLC island means continuous feeding and consumption of $CH_4$. This was accomplished according to the scheduling presented in FIG. 2. Six CLC reactor trains operating in parallel were used for the reference case and the two cases studied, to deliver continuous fuel consumption with time delay $\tau_{delay}$. The exhaust gas streams from each reactor were mixed according to their originating cycle. Thus, the overall exhaust of the CLC island was grouped as: $CO_2/H_2O$ from the reduction step, $N_2/O_2$ from the oxidation stage, and $N_2/O_2$ from the heat removal step. FIGS. 8A-8F show the exit gas temperature and enthalpy profiles of the six CLC reactor trains combined to form a CLC island according to the schedule of FIG. 2. Because the streams of the CLC trains are mixed at the exit of the CLC island, the temporal temperature profile of the heat removal exhaust from the CLC island (i.e., the gas stream feeding to the downstream gas turbine) exhibits less fluctuation than that of one single CLC reactor or train (FIGS. 7A, 7D and 7G). Specifically, the values of Or IT are much smaller than those of $\sigma_{HR}$ and less than 50° C. for all the cases studied (as imposed by the constraint on island exhaust temperature, Eq. (10)).

The performance of the three cases studied is summarized in Table 4 in terms of exit gas temperature and enthalpy, temperature and enthalpy standard deviation of each CLC stage for each reactor train and for the island, and overall energy efficiency as defined by Eq. (1). Cases I and II had higher flow rates of air fed to the HR stage (Table 3); therefore, the mean $\overline{TIT}$ values of Case I and Case II are lower than that of the reference case. Compared with the reference case, the energy efficiency of Cases I and II were increased by 2.8% and 7.6% points, respectively. In Case II, this was the result of modularization which enabled better management of the residual heat in the reactor during HR, while it allowed for more uniform conversion profiles during reduction. The standard deviation of TIT was lower than the required 50° C. and is suitable to be used as the feed to bottoming gas turbines. In summary, the results of Table 4 illustrate that the configuration of Case II was superior to its fixed bed reactor design equivalent. TIT can be increased if more advanced train configurations are allowed in the reactor design, such as more reactor modules and possibly more complex module ordering. If oxygen carrier materials can tolerate higher temperatures, than higher efficiencies are also possible.

TABLE 4

Performance summary of the reference fixed bed reactor, the CLC reactor train with two reactor modules, and that with three reactor modules.

| Parameters | Ref. | Case I | Case II |
|---|---|---|---|
| CLC train $T_{HR}$ [° C.] | 1256 | 1101 | 1243 |
| CLC island TIT [° C.] | 1256 | 1101 | 1243 |
| CLC island $T_{RED}$ [° C.] | 989 | 644.0 | 573.7 |
| CLC island $T_{OX}$ [° C.] | 658.6 | 834.9 | 517.8 |
| CLC train $\sigma_T$ [° C.] | 62 | 128 | 123 |
| CLC island $\sigma_{T\,IT}$ [° C.] | 23.1 | 36.5 | 34.2 |
| CLC island $\sigma_T$ [° C.] | 75.2 | 188.7 | 134 |
| CLC island $\sigma_T$ [° C.] | 31.3 | 45.5 | 43 |
| CLC train $h_{HR}$ Enthalpy [MJ/s] | 648.5 | 687.7 | 729.5 |
| CLC island $h_{RED}$ Enthalpy [MJ/s] | 86.9 | 54.4 | 54.0 |
| CLC island $h_{OX}$ Enthalpy [MJ/s] | 114.3 | 132.9 | 90.5 |
| CLC island $\sigma_h$ [MJ/s] | 18.0 | 225.6 | 21.6 |
| CLC island $\sigma_h$ [MJ/s] | 15.6 | 14.4 | 14.1 |
| CLC island $\sigma_h$ [MJ/s] | 6.0 | 15.1 | 7.4 |
| η [%] | 77.1 | 79.9 | 84.7 |

Conclusions—Section 1

Process intensification for chemical looping combustion reactors is disclosed herein in the form of reactor modularization. Specifically, fixed bed reactors are described that are split into small reactor modules emulating the performance of a simulated moving bed reactor. The scheduling of the reactor modules is determined as a dynamic optimization problem that decides process variables and time intervals for the operation of each module at different chemical looping stages. Moreover, the problem formulation allowed for reversal of the order of reactor modules, depending on the heat distribution inside each module in each stage of the chemical looping redox cycle. It has been shown that with a reactor train of three reactors, in a chemical looping reactor island of six trains the overall energy efficiency of the process can be significantly improved, while satisfying constraints of carbon capture, feed conversion and exit gas temperature variations. It has also been shown that allowing the reversal of the ordering of reactor modules in the train during the oxidation and heat removal stages of the chemical looping redox cycle substantially aids the uniformity of temperature and conversion profiles inside the modules, which leads to higher efficiency. Although the solution is described herein with reference to a small number of modules, the optimization and scheduling formulations presented, if subjected to realistic capital investment and operational constraints, can lead to modular and intensified processes that avoid the need for large fluidized bed reactors operating at high pressure.

Implementation—Metal Imides for Distributed Ammonia Synthesis

Natural gas released during oil extraction is called associated gas and if it is unrecoverable due to physical or economic reasons, it is called stranded natural gas (SNG). SNG is also the name given to natural gas reservoirs that are in remote locations far from the infrastructure necessary to recover it economically. In areas where it is permitted, SNG is flared to the atmosphere to remove it from the oil being recovered. The amount of natural gas flared during the 2011-2017 time period has increased from 100 to 250 Bcf per year, releasing more than 300 million tons of $CO_2$ into the atmosphere. Natural gas flaring exacerbates the pending climate crisis, adds another pollution contributor to the oil and gas industry, and wastes a valuable feedstock. Because of the small well capacity, remote location and small lifecycle, traditional, large-scale chemical plants are economically unrealistic. A successful SNG recovery technology is defined by the US Department of Energy as a small-scale, modular technology, capable of being moved between flaring sites during times of inactivity, while producing an economically viable product.[†] Reformed natural gas can be converted to ammonia via the Haber-Bosch process ($N_2$+ $3H_2 \leftrightarrow 2NH3$), but this faces the challenges of scale and inefficiency. Despite continuous efforts to optimize the Haber-Bosch process, about 1-2% of all energy consumption in the world is, in part, due to its high temperature (~200-600° C.) and pressure (~20-40 MPa) requirements. In thermal catalytic ammonia synthesis, introducing a second component to interfere catalysis or creating a scenario to alter the bonding geometry and electronic nature of reacting species can optimize the energetics of catalysis that is critical for NH3 synthesis under mild conditions. It would be economically and operationally favorable to allow lower energy activation of the N≡N bond and improve ammonia synthesis.

Figure 9:
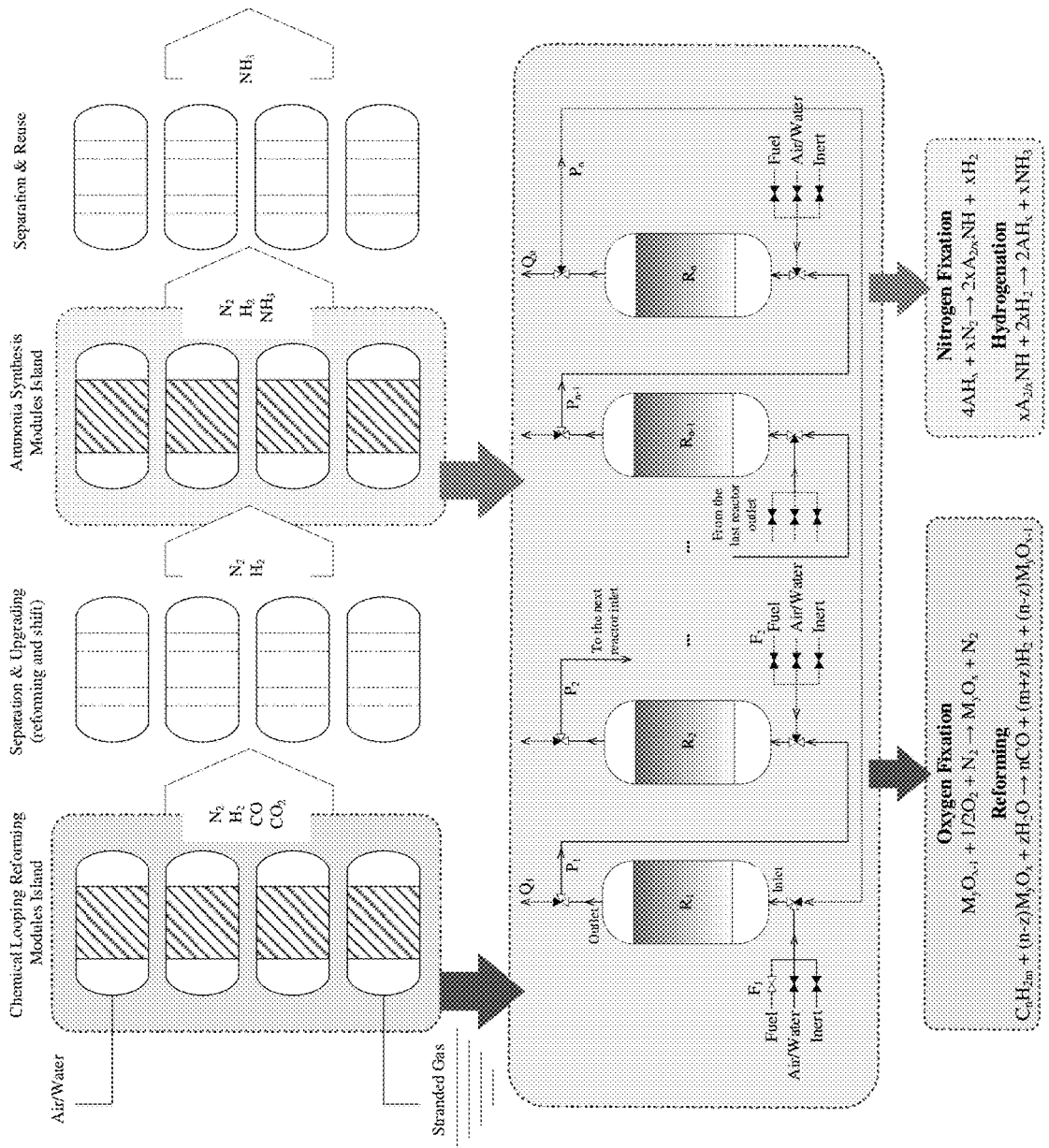
FIG. 9 is an overview of a disclosed process for modular ammonia synthesis according to the present disclosure.

The present disclosure addresses distributed and modular chemical manufacturing options for the synthesis of transportable ammonia from stranded natural gas. Specifically, ammonia synthesis options that leverage chemical loops of metal imides and metal nitrides are addressed, and techno-economically feasible solutions for the utilization of stranded gas, a significant portion of which is currently flared, are discussed/disclosed. The key challenge is to provide a new conversion process that leverages advances in distributed process intensification, reactor modularization, separations optimization and catalyst discovery, which are necessities for remote chemical plants. Ammonia is selected as the target product for four key reasons: (a) ammonia is one of the most important synthetic chemicals, with annual production over 160 million tons; (b) as a fertilizer, ammonia supports food crops of approximately half of the world's population; (c) ammonia is easily liquefied to a stable hydrogen carrier; and (d) areas rich in stranded natural gas in the U.S. overlap geographically with agricultural areas in need for fertilizer. An overview of the disclosed chemical process is presented in FIG. 9 and discussed in detail in the following sections. The disclosed technology builds on the following hypothesis, addressed through convergent research discussed hereafter:

Conversion of stranded natural gas to ammonia is economically viable, and environmentally friendly in a distributed manufacturing landscape of remote plants, with dynamically changing inputs, requirements, and lifecycles, strict environmental constraints, and uncertainty.

Distributed chemical manufacturing of ammonia can be accomplished in novel chemical looping schemes for stepwise synthesis of hydrogen from natural gas and nitrogen from air.

i) Chemical looping reforming for $N_2$ and $H_2$ production: Chemical-looping (CL) accomplishes $O_2$ separation by a dual-step approach, in which a hydrocarbon fuel is oxidized by a metal oxygen carrier that is then regenerated via air oxidation. In the oxidation step, the reduced metal is regenerated in air with concomitant production of $N_2$. The first aim of this disclosure is to address chemical looping as a nitrogen production process, in which hydrogen is a byproduct. With this novel reforming (CLR), we can enable the production of $N_2$ in distributed plants, without the need for high capital investment, and energy-hungry air separation units. Materials and reactor intensification options for CLR are explored, but with the target being the complete consumption of $O_2$ in the oxidation stage and the production of an oxygen-free $N_2$ stream. Conventional materials are used as oxygen carriers based on Ni, Cu, and Fe along with novel materials disclosed by Gao. The key objective is to operate a chemical looping reactor for $N_2$ production, with constraints on the conversion of natural gas, $H_2$ production and reactor footprint. For the latter, we disclose the use of reverse-flow and moving bed reactor concepts.

ii) Metal nitride or imide nanoarray catalysts for ammonia synthesis: According to the present disclosure, a new class of metal nitride and imide nanoarray catalysts for low temperature ammonia synthesis are provided. Catalyst synthesis will follow a rational design strategy, starting with the synthesis and characterization of nitrides and imides of alkaline earth metal or transition metal (e.g, Mg, Ca, Sr, Mo—Ta, Ni) in the form of nanoarrays, per a preliminary analysis. We will employ oxide nanostructures as the precursors for fabrication of nanoarrays followed by metal doping or loading for tuning catalytic activity for low temperature activation. The oxide arrays will be converted to nitrides or imides via thermal treatment. On the nitride or imide supported catalysts, sub-nanometer dispersion of noble metals can alter the catalytic performance and reaction pathway of ammonia synthesis due to the low-coordination and space confined environment, quantum size effect, and improved electronic metal-support interactions. Post treatment using acid or base etching, or atmosphere-controlled annealing will, then, be deployed to introduce multi-nodal porosity to improve catalyst mass transport.

iii) Intensified chemical reactors that enable modular and distributed ammonia synthesis: Distributed ammonia synthesis will be explored as a dynamic chemical reactor design problem. Process intensification and modularization will be accomplished in advanced fixed bed reactor configurations. The production of stranded natural gas is continuous and variable over time, which requires semi-batch reactor modules that are integrated into module trains that comprise the ammonia synthesis reactor island of the distributed ammonia synthesis plant. The scheduling of each reactor train will be cast as an optimization problem that maximizes ammonia production subject to constraints imposed to each reactor and the entire island. In prior work, it was shown that when the CL reactors are arranged cyclically, each feeding to or being fed from another reactor, in an operating scheme that mimics simulated moving bed reactors, thermodynamic efficiency can be improved. Allowing the reversal of module order in the cyclically arranged reactor modules further improves the overall thermodynamic efficiency, while satisfying constraints imposed for carbon capture, fuel conversion, plant safety and oxygen carrier stability. Here, the task is to explore the feasibility of this recent invention for ammonia synthesis. The novel reactor configurations will first be modeled and then verified experimentally. Separation in-situ the reactor to relax the thermodynamic limitations of nitrogen fixation and hydrogenation reactions will be explored in membrane reactor modules.

iv) Process synthesis and optimization for distributed chemical manufacturing: Distributed ammonia synthesis will be formulated as a design-under-uncertainty problem, whereby we seek an optimal design (a process flowsheet configuration) that is robust to uncertainty. To accomplish this, we propose formulating the process synthesis problem using a block superstructure approach with the capabilities of simultaneous synthesis and intensification. This approach may be augmented to formally account for uncertainty in the reactor boundaries, resource availability, along with general modeling uncertainty. We will incorporate parametric uncertainty and formulate a mixed-integer bilevel program where the lower-level program seeks the worst-case realization of uncertainty and the upper-level program determines an optimal flowsheet that minimizes the effects of uncertainty. This task aims to maximize process efficiency within the transient and constrained boundaries of stranded natural gas wells. We will also consider operational robustness with respect to safety specifications (e.g., reactor temperature and pressure). The dynamic programs will be solved using recent advances in global dynamic optimization.

v) Life cycle analysis including detailed greenhouse gas emissions analysis: Complete economic and environmental lifecycle analyses (LCA) will drive the assessment of the process options proposed. The environmental LCA will focus primarily on the greenhouse gas emissions of the processing and distribution model based on the transient performance/emissions of the operation over a project lifetime (30-50 years). Additionally, we will consider economic LCA over the same period without accounting for any emissions costs. In this case, we consider time-value capital and operating costs, debt service, generated revenue, insurance, and taxes. With each of these LCAs, we will assess the economic feasibility and investment risk with respect to potential environmental impact tariffs and enable an appropriate valuation to environmental impact.

According to the present disclosure, a process to convert SNG to ammonia is provided because, inter alia, the latter is currently synthesized using hydrogen derived from natural gas, it is easily transported and necessary to sustain population growth through fertilizer production. Ammonia has been synthesized through the direct combination of nitrogen and hydrogen over an iron catalyst for over a century using the Haber-Bosch process:

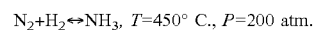

$N_2+H_2 \leftrightarrow NH_3$, $T=450°$ C., $P=200$ atm.     R1

Efforts have been made to improve catalyst selectivity, reduce operating pressure and optimize heat integration of the Haber-Bosch process and specifically of R1. Modern, optimized Haber-Bosch plants still require high pressure (>200 atm) to shift the equilibrium of R1 forward, which accounts for 10-16% of the process energy demand. Therefore, the use of a low-pressure ammonia synthesis process for SNG recovery is highly desirable. The overarching outcome of the proposed effort will be a new modular process for the conversion of SNG to ammonia. At the heart of this process lies the challenge of converting $H_2$ and $N_2$ to $NH_3$ at small scale and at lower pressure. The chemical looping method provides a different ammonia synthesis route by splitting reactions for higher energy efficiency, lower thermodynamic energy barriers, and excellent kinetic tunability. The use of intermediate imides or nitrides as $N_2$ fixation precursors, to be reacted with $H_2$ at low temperature and pressure, decouples the traditional chemistry of ammonia synthesis. This allows independent control of reaction conditions for $N_2$ activation and $NH_3$ formation, and therefore, it circumvents the competitive chemisorption of reacting species on catalyst surface that typically limits the activity of conventional catalysts. For instance, in processes using alkali/alkaline earth metal imides, $N_2$ is first reduced by an alkali/alkaline earth metal hydride forming an imide and, subsequently, the imide is hydrogenated by $H_2$ to yield $NH_3$ and regenerate the hydride. This chemical loop leverages the hydrides for $N_2$ activation and conversion, with the essence of H shuttling among chemical states. Ammonia chemical loops face challenges from the tradeoff required between $N_2$ cleavage by forming the N-containing compound and $NH_3$ formation upon contacting with the hydrogen source. For example, the subsequent hydrogenation rate might be limited by mass transfer or kinetics, and vice versa if the reduction of $N_2$ is favorable. Materials modification/screening, process integration/optimization and novel platform design are needed.

Multi-step chemical loops for ammonia synthesis (CLAS) have been proposed as a low-pressure process alternative to yield R1 as the overall reaction, sometimes with a byproduct. The series of reaction steps are mediated by compounds suitable for nitrogen fixation in one step and ammonia synthesis in the subsequent step. Because nitrogen, hydrogen and ammonia are never present in the same reaction step, the equilibrium does not impose requirements for high pressure to shift R1. Ammonia synthesizing chemical loops proposed in the literature are still in an early stage of development, and efforts to optimize them for industrial use are yet to be undertaken. Additionally, the variability of operating temperature (100-1200° C.), mediating compounds (e.g., Imides, Oxides, Nitrides), hydrogen source ($CH_4$, $H_2O$), ammonia output (1.2-40.6 mmol $NH_3$ per gram of mediating compound per hour) and energy intensity of each chemical loop make selecting a CLAS that is suitable for small-scale SNG recovery a nontrivial task. Therefore, we performed a preliminary detailed assessment of candidate CLAS processes against a logical framework that determines their suitability for further optimization towards a SNG recovery solution.[2] This framework and the outcomes of this analysis are discussed in the next Section.

Feasibility

One commonality between all CLAS schemes is the use of a mediating compound. The element attached to the mediating compound, referred to here as the material carrier, may be different in different versions of the same chemical loop. In Table 5, we have categorized all loops into schemes and provide examples of each. Nitride (N)-Hydride (H) Chemical Loops for Ammonia Synthesis (NH-CLAS) use material carriers that form nitrides and hydrides. Material carriers capable of forming compounds for this chemical loop include various elemental groups that are represented by M in the general reaction, shown in Table 1. One feasible scheme for NH-CLAS, starts with the nitridation of the hydride to yield the corresponding nitride and hydrogen. In the second step, the nitride is hydrogenated to produce ammonia and the corresponding hydride. This scheme is a modification of the cyclical ammonia synthesis process, first proposed in 1905 and studied by Haber, shown in the last column of Table 5. Some material carriers are capable of forming ammonia synthesis chemical loops simply by the partial reduction of their nitride with hydrogen, alleviating small amounts of their lattice nitrogen to synthesize ammonia. The chemical loop is completed by using the partially reduced nitride to fix nitrogen. These loops are termed Partially Reduced Nitride Chemical Loop for Ammonia Synthesis ($N_{b-\delta}$-CLAS) in Table 5. Alkali Imide (ANH)—Alkali Hydride (AH) Chemical Loop (ANH-CLAS) start with reacting the alkali hydride with nitrogen to produce the alkali imide and hydrogen, followed by the alkali imide reduction with hydrogen to synthesize ammonia and the alkali hydride. Nitride (N)-Oxide (O) chemical loops for ammonia synthesis (NO-CLAS) use three reaction steps to synthesize ammonia. In the first step, the elemental material carrier is used to fix nitrogen to produce the nitride. In the second step, the hydrolysis of the nitride yields ammonia and the oxide form of the material carrier. The metal oxide is then reduced with a carbonaceous reducing agent through an energy intensive step (>1200° C.) to recover the elemental form of the material carrier. Finally, in Cyanide Chemical Loop for Ammonia Synthesis (CN-CLAS), in the first step the carbonate form of the material carrier is reacted with carbon and nitrogen to produce the cyanide form of the material carrier and carbon monoxide. Hydrolysis of the cyanide takes place in the second step of the process to yield ammonia, carbon monoxide and the corresponding hydroxide or formate form of the material carrier. Hydrolysis of the cyanide may yield the hydroxyl form of the material carrier (shown in Table 1) or its formate form.

TABLE 5

CLAS Schemes and example reactions analyzed in connection with this disclosure

| CLAS Scheme | Feasible Schemes | Example Scheme |
|---|---|---|
| Nitride (N) - Hydride (H) (NH-CLAS) | $MH + N_2 \leftrightarrow MN + H_2$<br>$MN + H_2 \leftrightarrow MH + NH_3$ | $3CaH_2 + 3N_2 \leftrightarrow Ca_3N_2 + NH_3$<br>$Ca_3N_2 + 9H_2 \leftrightarrow 3CaH_2 + NH_3$ |
| Partially Reduced Nitride ($N_{b-\delta}$-CLAS) | $M_aN_b + 3\delta/2 H_2 \leftrightarrow M_aN_{b-\delta} + \delta NH_3$<br>$M_aN_{b-\delta} \, \delta/2 N_2 \leftrightarrow M_aN_b$ | $UN_2 + 1.5H_2 \leftrightarrow UN + NH_3$<br>$UN + \frac{1}{2}N_2 \leftrightarrow UN_2$ |
| Alkali Imide (ANH) - Hydride (AH) (ANH-CLAS) | $4AH_a + aN_2 \leftrightarrow 2aA_{2/a}NH + aH_2$<br>$aA_{2/a}NH + 2aH_2 \leftrightarrow 2AH_a + aNH_3$ | $BaH_2 + \frac{1}{2}N_2 \leftrightarrow BaNH + \frac{1}{2}H_2$<br>$BaNH + 2H_2 \leftrightarrow BaH_2 + NH_3$ |
| Nitride Oxide Chemical Loops (NO-CLAS) | $M_a + N_2 \leftrightarrow M_aN_b$<br>$M_aN_b + H_2O \leftrightarrow M_aO_b + NH_3$<br>$M_aO_b + C \leftrightarrow M + CO$ | $4WO_2 + 2.7CH_4 \leftrightarrow 4W + 2.7CO + 5.3H_2O$<br>$4W + N_2 \leftrightarrow 2W_2N$<br>$2W_2N + 8H_2O \leftrightarrow 2NH_3 + 4WO_2 + 5H_2$ |
| Cyanide Chemical Loops for Ammonia Synthesis (CN-CLAS) | $M_aCO_3 + C + N_2 \leftrightarrow MCN + CO$<br>$MCN + H_2O \leftrightarrow M_a(OH)_b + NH_3 + CO$<br>$M_a(OH)_b + CO_2 \leftrightarrow M_aCO_3 + H_2O$ | $Na_2CO_3 + 4C + N_2 \leftrightarrow 2NaCN + 3CO$<br>$2NaCN + 2H_2O \leftrightarrow 2NH_3 + 2NaCHO_2$<br>$2NaCHO_2 \leftrightarrow 2Na_2CO_3 + 2H_2 + 2CO$ |

Figure 10:
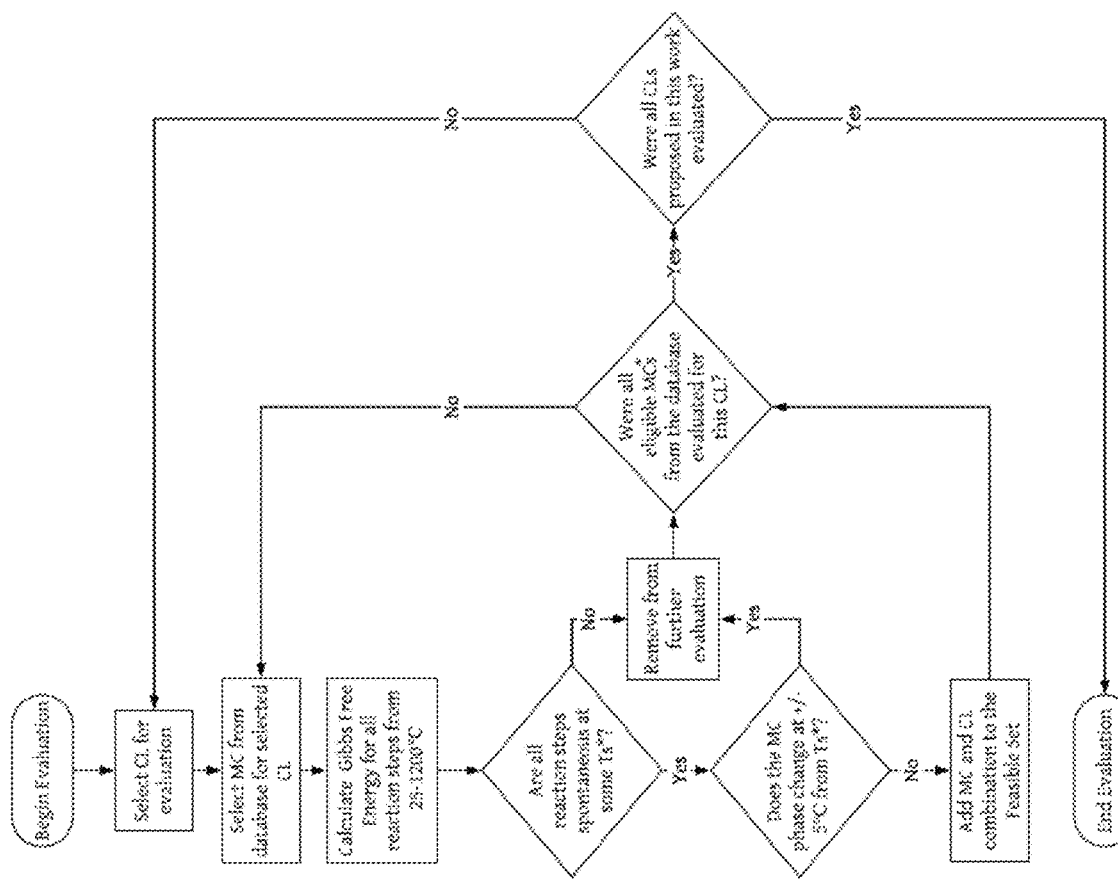
FIG. 10 is a logical flow diagram to evaluate material carrier and chemical loop combinations. MC is used in the diagram to represent Material Carriers and CLAS represents Chemical Loops for Ammonia Synthesis. An eligible material carrier is a material carrier capable of forming the compounds necessary to participate in the chemical loop.

FIG. 10 is a logical flow diagram to evaluate material carrier and chemical loop combinations. MC is used in the diagram to represent Material Carriers and CLAS represents Chemical Loops for Ammonia Synthesis. An eligible material carrier is a material carrier capable of forming the compounds necessary to participate in the chemical loop.

Figure 11:
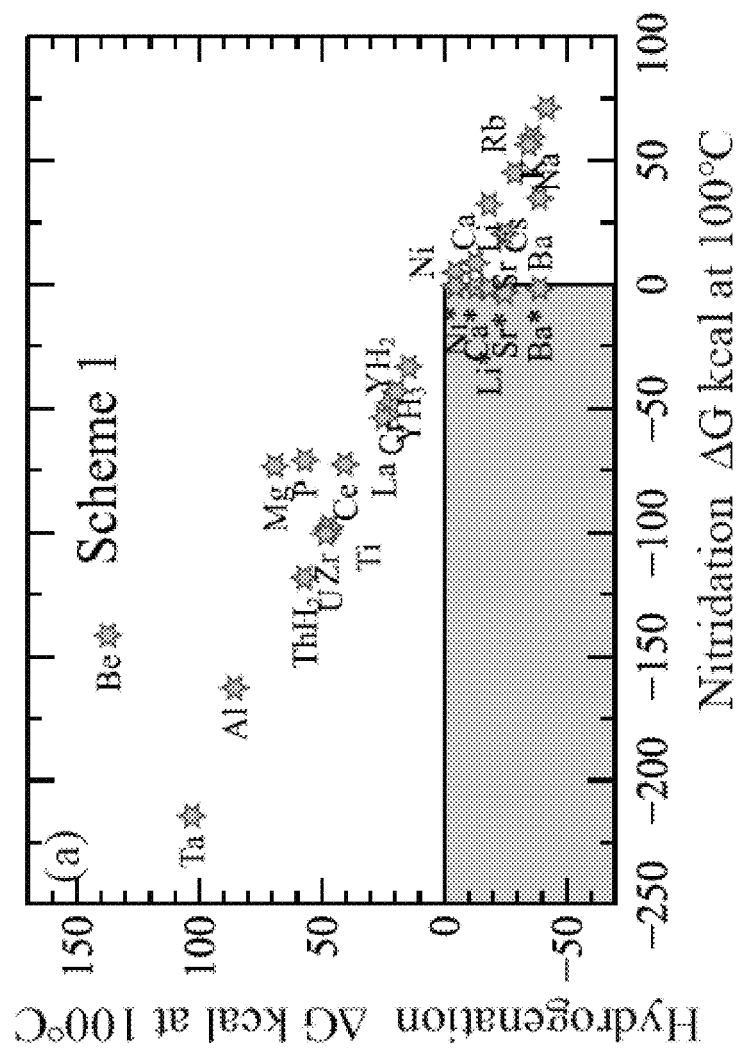
FIG. 11 provides ΔGr of each reaction step of the NH-CLAS proposed in Table 5. The shaded box in the lower left corner visually identifies chemical loops where both reaction steps are spontaneous at the plotted temperature. Material carriers with an asterisk signify a spontaneous reaction step at a temperature other than the one plotted.
Figure 14D:
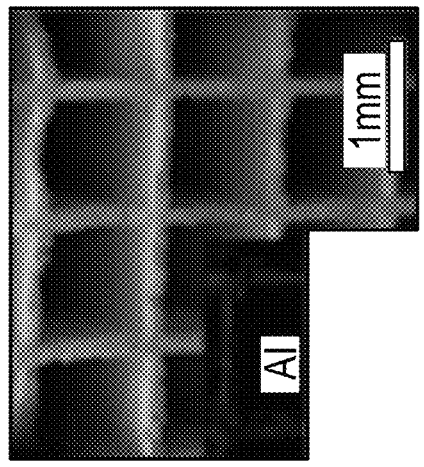
Figure 14E:
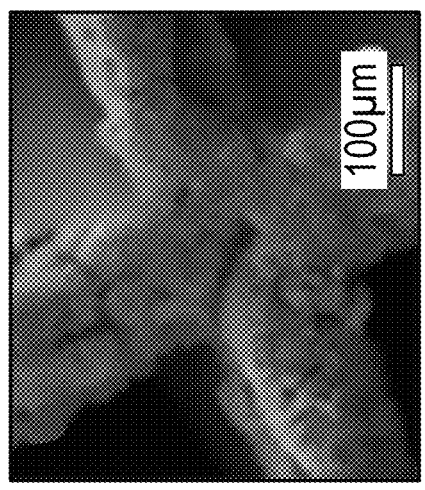
Figure 14F:
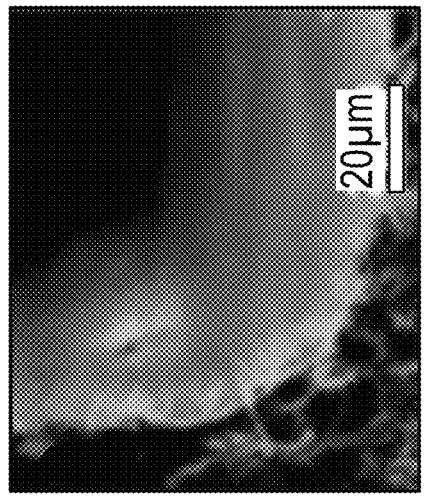
Figure 14G:
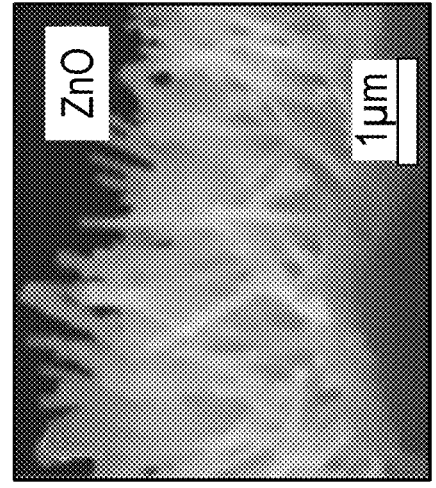
Figure 14H:
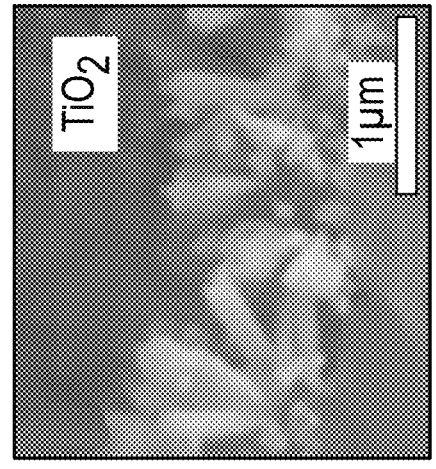
Figure 14I:
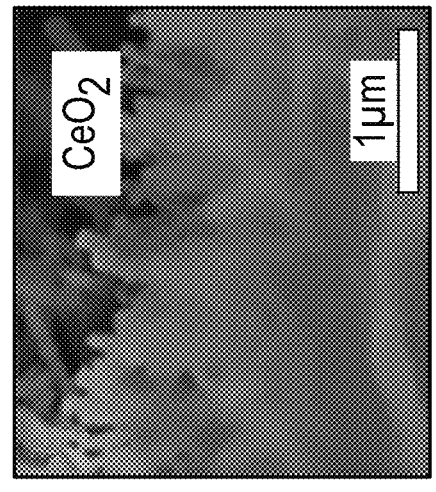

FIG. 11 provides ΔGr of each reaction step of the NH-CLAS proposed in Table 5. The shaded box in the lower left corner visually identifies chemical loops where both reaction steps are spontaneous at the plotted temperature. Material carriers with an asterisk signify a spontaneous reaction step at a temperature other than the one plotted.

It becomes obvious that the decomposition of ammonia synthesis into separate steps has several hundreds of possibilities, depending on the scheme and materials used. As it will become obvious later, the majority of these schemes are infeasible. To prove this and reduce the dimensionality of the scheme selection problem, we developed the logical workflow of FIG. 10 for the down-selection (feasibility) and ranking (efficiency metrics) of these schemes. The evaluation process of FIG. 10 begins by selecting material carriers that can form the compounds necessary to mediate ammonia synthesis in each chemical loop. Material carriers and compounds were selected from the HSC thermochemical database. Each reaction step of the material carrier and chemical loop combination was stoichiometrically balanced and the Gibbs free energy change of the reaction was subsequently calculated at the specified temperature, T. The Gibbs free energy change was calculated from 25° C. to 1200° C. using thermodynamic data included in the HSC database to find a temperature T* where the reaction is spontaneous. The Gibbs free energy change, $\Delta G_r$, of each reaction step in the chemical loop was then plotted against each other to visually identify chemical loops that are spontaneous in all steps. Next, material carriers in spontaneous chemical loops were cross-referenced with melting and boiling point data to ensure that T* is not ±5° C. from a phase change temperature. Material carrier and chemical loop combinations that are spontaneous at a given T* and do not phase change within ±5° C. from T* make up the feasible set.

FIG. 12 is a comparative ranking of CLAS in the feasible set. M/NH3 is the molar ratio of material carrier need to synthesis one mole of ammonia. MJ/mol is the energy input (MJ) required to synthesis one mole of ammonia. SM/NH3 is the initial cost of the material carrier required to synthesis one mole of ammonia in the given chemical loop and material carrier combination. COx/NH3 is the molar ratio of carbon dioxide or carbon monoxide released per mole of ammonia as a result of the reactions in the chemical loop. H2 form used represents the form of hydrogen used in the chemical loop. Additional chemistry needed refers to the additional consumable feedstock needed, beyond nitrogen and hydrogen, to execute the given chemical loop.

The combinations in the feasible set were then evaluated against each other to infer relative values of initial material carrier cost, operating costs and system footprint. The equilibrium amount of ammonia synthesized from each reaction in the feasible, set at T*, was determined from a stoichiometric feed of the reactants in the respective ammonia synthesis step. The molar ratio of material carrier fed to ammonia synthesized at equilibrium $M/NH_3$ is reported in FIG. 12 and was used to infer relative reactor size and footprint. The majority of chemical loops identified in this work use the elemental form of the material carrier. Therefore, quoted prices of the elemental form of the material carrier, were used as a method of comparing initial material carrier costs of each chemical loop in the feasible set. The material carrier cost per mole of ammonia synthesized $M/NH_3$, is reported in FIG. 12, to be understood as the initial cost assuming no attrition, loss or damage of the material carrier throughout usage in the loop. The reaction enthalpy for each reaction step of chemical loops in the feasible set were calculated at T* using thermodynamic data from the HSC database from a feed temperature of the previous reaction step. This calculation method assumes no heating or cooling in between reaction steps, no heat integration or optimization. The ratio between the energy input requirement of each chemical loop and the amount of ammonia synthesized from each chemical loop at equilibrium MJ/mol is reported in FIG. 12.

For the most promising CLAS options of FIG. 12, Aspen Plus simulations were performed to evaluate the overall feasibility of the process. This analysis resulted in the recommendation of only a handful of CLAS schemes for further evaluation. These schemes are all thermodynamically feasible, economically positive, and have zero on near-zero carbon-footprint (when compared with flaring as the baseline). Therefore, we formulated two separate baseline processes, with which we ought to compare the proposed CLAS options: (a) process efficiency, flexibility and footprint compared to the Haber-Bosch process; and (b) carbon footprint and energy input reduction compared to SNG flaring. The summary of this benchmarking is provided in Table 6. Process flexibility is set to have a minimum target of 50% improvement over the large-scale, high-pressure Haber-Bosch process, because of the modularity of the process schemes discussed in Tasks 1 and 3 of Section 3 and the robust process synthesis of Task 4. Energy input reduction is set to have a minimum target of 50%, up to 75%. This is the result of the novel CLAS schemes, which are anticipated to favor lower energy requirements for the ammonia synthesis step. Carbon footprint reduction of 70%-90% is reasonable and easily attainable when compared to SNG flaring. The baseline of the Haber-Bosch process is also provided in Table 2. Carbon footprint is a formal constraint in the optimization algorithms discussed in Tasks 1 and 3 of Section 3, and a key component in the process life-cycle analysis of Task 5. Finally, our target for the catalyst lifetime is to be approximately that of KM1 catalyst (10 years). This is, in part the focus of Task 2 of Section 3, and also supported by the exclusive use of fixed-bed reactors, wherein attrition and looping material degradation are significantly lower than in alternative processes.

TABLE 6

Target level of performance against baseline performance of the Haber-Bosch process.

| Objective/Goal | Metric | Minimum Target | Stretch Target | Baseline Performance/Cost |
|---|---|---|---|---|
| Process flexibility | Allowable variability in operating envelope from normal operation | 50% | 90% | 20% |

TABLE 6-continued

Target level of performance against baseline performance of the Haber-Bosch process.

| Objective/Goal | Metric | Minimum Target | Stretch Target | Baseline Performance/Cost |
|---|---|---|---|---|
| Energy input reduction | Energy consumed per ammonia nitrogen from ammonia synthesis | 50% | 75% | 40-50 GJ t $NH_3$—$N^{-1}$ |
| Carbon footprint reduction | $CO_2$ equivalents per ammonia nitrogen from ammonia synthesis | 70% | 90% | 5 $CO_2$-eq t $NH_3$—$N^{-1}$ |
| Retain catalyst lifetime | Match the catalyst lifetime of KM1 Haber-Bosch catalyst | −10% | 10% | KM1 - 10 yrs |

Key Technical Risks: The Process Proposed has Several Key Technical Risks that Will be Addressed During this Project:
 a) $H_2$ production may be limited in the $N_2$-producing CLR reactor and insufficient for the CLAS reactor. Mitigation: We will explore membrane separation or supplemental reforming;
 b) Ammonia yield may be low due to kinetic limitations of the looping materials. Mitigation: We will explore integrated reactor/separation modules and nanoarray catalysts;
 c) Nanoarray catalysts may not meet the robustness performance targets. Mitigation: In-situ growth of nanoarrays on functional surfaces can improve catalyst robustness;
 d) LCA of individual wells of SNG may show unfavorable economics. Mitigation: We will explore semi-centralized options, in which the SNG of more than one wells is locally concentrated and processed.

Thus, according to the present disclosure, a convergent approach is disclosed that invests on recent laboratory findings on new ammonia synthetic routes and focuses on improving these findings and most importantly convert these findings to novel reactor and process designs for distributed chemical manufacturing. The challenges of stranded natural gas utilization and that of ammonia synthesis are two problems with potentially a common solution. Innovations in catalyst and reactor design, process synthesis and separations for the particular case of operating under uncertainty in a resource-constraint environment are proposed in a structured research plan discussed next.

Of note, a newly developed impregnation method has been developed to prepare Ru and other metals at single atom or sub-nanometer dispersion on high surface area metal nitrides nano-arrays, such as $MgN_x$ and $NiN_x$ nanowire or nanosheet arrays for ammonia synthesis. On the oxide supported catalysts, single atomic dispersion of some noble metals such as Pt, Rh, and Pd has been reported. It is expected that when the size of metal nanostructures is decreased from nanometer to sub-nanometer scale and single atoms, the catalytic performance and reaction pathway of ammonia synthesis may change significantly due to the low-coordination and space-confined environment, quantum size effects, and improved electronic metal-support interactions. To improve the mass transport under space confinement, nanostructures with mesoporosity or multinodal porosity will be introduced through synthetic chemical control or post nanostructures treatment using acid, base, or atmosphere controlled annealing. Impregnation/dip coating, or colloidal deposition will be used. Post reducing-atmosphere annealing at elevated temperature will be used to help create metal nanoparticles and metallurgical bonding between nano-arrays and supported metal nanoparticles.

As an example, using solution and vapor phase deposition techniques, the Gao group has successfully fabricated large-scale arrays of nanostructures made of metal oxides and nitrides with controlled size, orientation, and distribution on various solid substrates. The morphology, size, and shape could be tuned by adjusting parameters in the synthesis process to meet various criteria in practice. The Gao group also successfully integrated various nano-arrays onto 3D substrates, such as metal and ceramic honeycombs. A full-size 4.7" diameter metal oxide nano-array integrated monolithic device is demonstrated in FIGS. 14A-14I.

Figure 15:
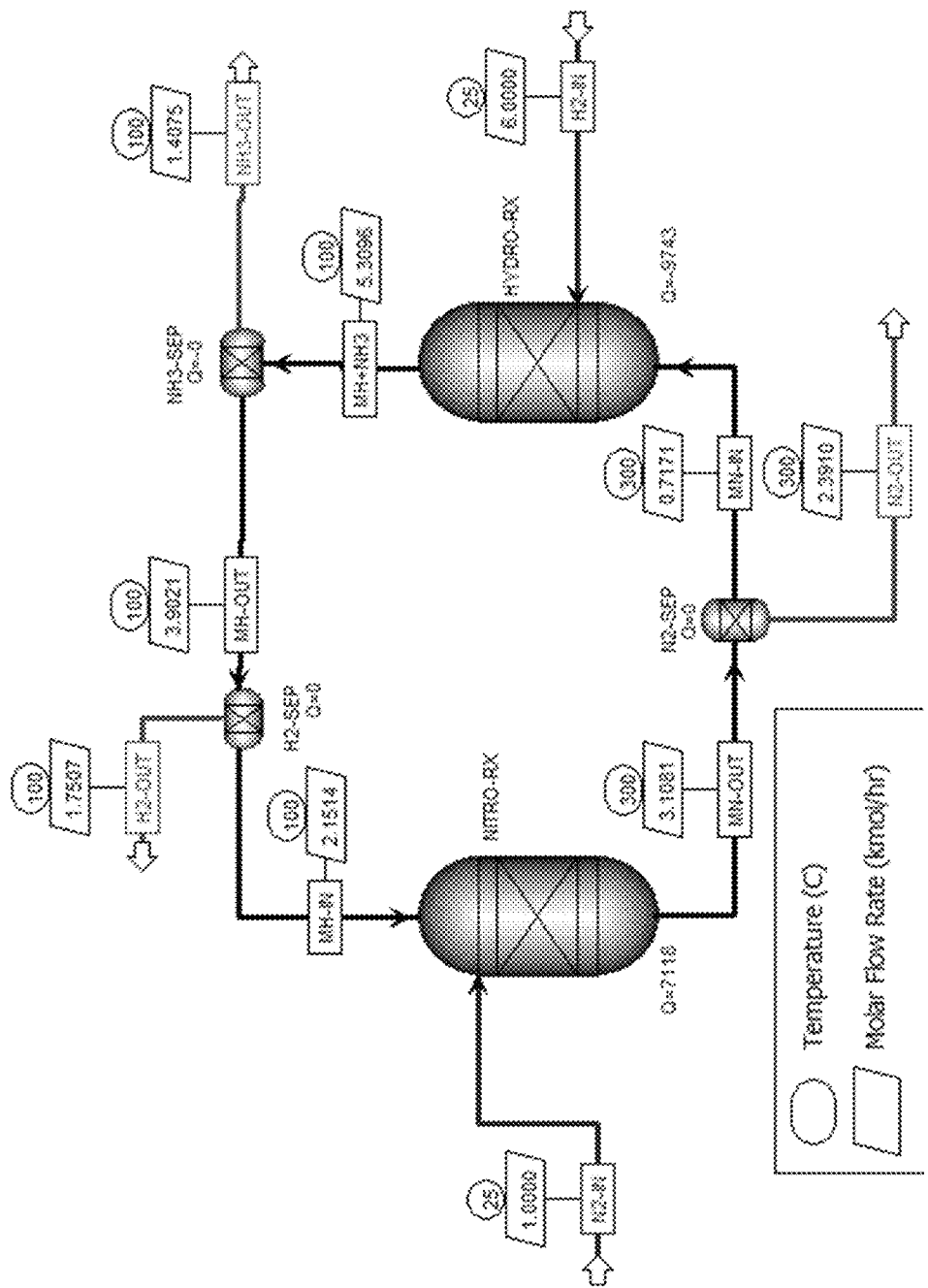
FIGS. 15 and 16 provide NH-CLAS Aspen flowsheets, as follows.
Figure 16:
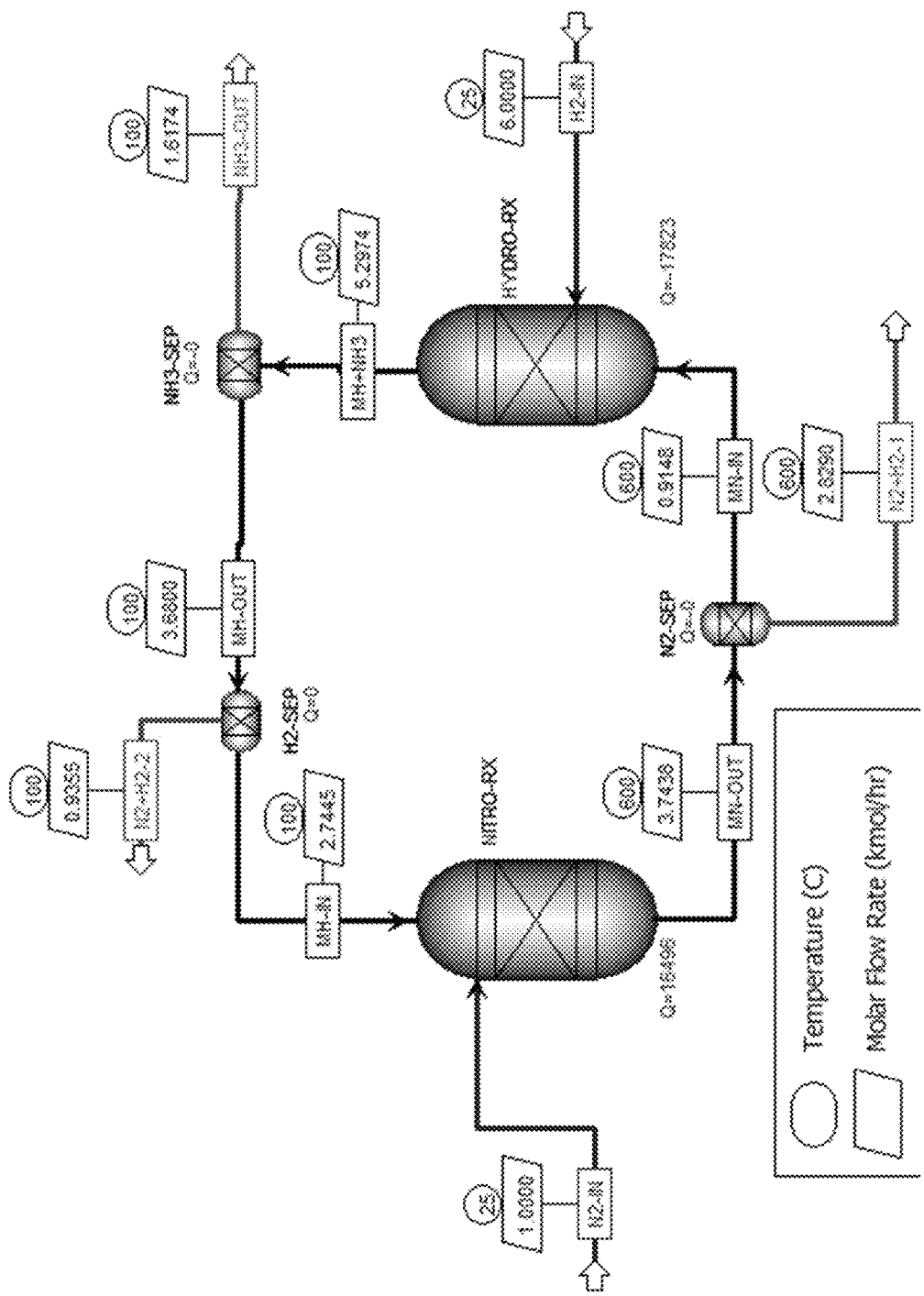

The feasibility of the proposed concept was validated against the HSC database and Aspen Plus flowsheets for select chemical loops. Ca and Sr in NH-CLAS were turned into the Aspen flowsheets shown in FIGS. 15 and 16. Aspen Plus Gibbs free energy reactors were used to carry out the reactions of nitridation and hydrogenation. Gibbs free energy reactors were set to the spontaneous temperature T* for each reaction and 1 atm pressure, with no restrictions on products. All reactors were feed with a stoichiometric amount of reactant to carry out each reaction. Unreacted reactants and byproducts were separated from the reactor outlet using a simplified separation unit that has no effect on the temperature or pressure of the stream. As shown in FIGS. 15 and 16, the NH-CLAS simulation begins with a stoichiometric feed of pure nitrogen to the nitridation reactor NITRO-RX where the hydride form of the material carrier fixes nitrogen. The nitride and unreacted nitrogen leaves NITRO-RX to enter a separator which separates nitrogen and hydrogen from the nitride. The nitride enters the hydrogenation reactor, HYDRO-RX, where it is reacted with a stoichiometric feed of hydrogen. Ammonia, hydrogen and the hydride form of the material carrier leave HYDRO-RX to have the ammonia separated by NH3-SEP, and the hydrogen separated by H2-SEP. The hydride is returned to NITRO-RX, completing the chemical loop and starting over the process.

Figure 17B:
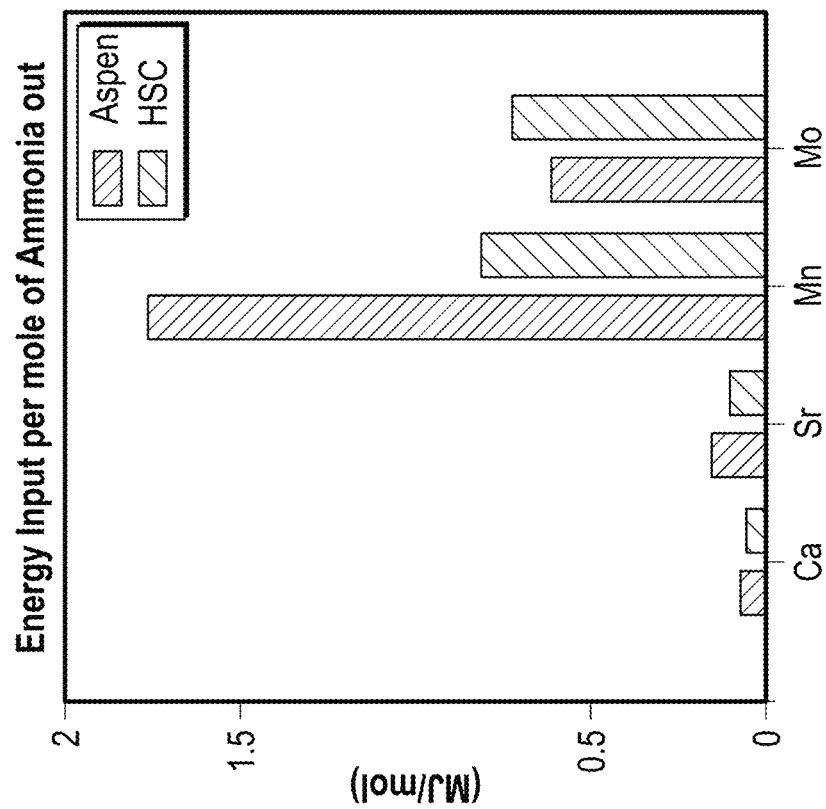
FIGS. 17A and 17B provide a comparison between HSC results and Aspen plus results for a select NH-CLAS and NO-CLAS based on ammonia output (FIG. 17A) and energy input per mole of ammonia output (FIG. 17B).
Figure 17A:
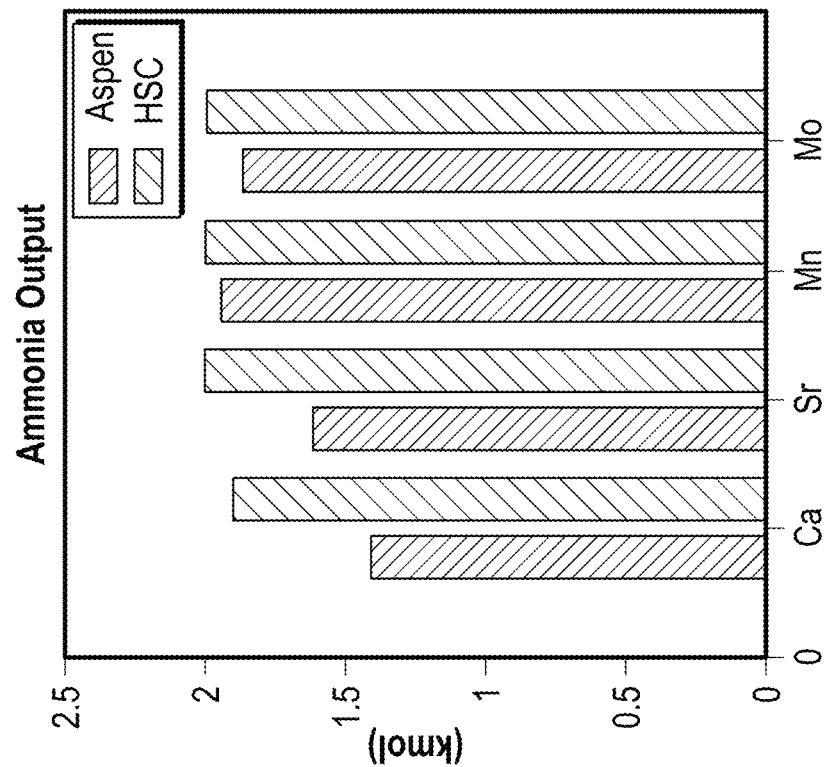

The performance of the CLAS Apsen Plus flowsheets of FIGS. 15 and 16 is presented in FIGS. 17A (ammonia output) and FIG. 17B (energy input per mole of ammonia output). Notwithstanding that this analysis did not consider the cost for separations, heat integration options and the impact of reaction kinetics, the analysis indicated Ca and Sr to be among the most promising materials for NH-CLAS. This preliminary analysis (performed for all the materials and chemical loops discussed herein), indicated five material carrier and chemical loop combinations as most promising for further analysis toward a SNG recovery solution: Mg (NH-CLAS), Ca(NH-CLAS), Sr(NH-CLAS), Ni(NH-CLAS), and Ta—Mo (NH-CLAS) (in order of lowest to highest material carrier cost per mole of ammonia produced).

Although the present disclosure has been provided with reference to exemplary embodiments/implementations, the present disclosure is not limited by or to such exemplary embodiments and/or implementations.

The invention claimed is:

1. A system for chemical-loop reactor-based processing, comprising a plurality of chemical-looping reactors that includes at least a first reactor, a second reactor and a third reactor arranged cyclically,
wherein each of the plurality of chemical-looping reactors includes an inlet and an outlet; and
wherein the first reactor, the second reactor and the third reactor are fed cyclically such that feedstock flow to the plurality of chemical-looping reactors is initially fed to the inlet of the first reactor, then feedstock flow is fed to the second reactor and then feedstock flow is fed to the third reactor,
wherein feedstock flow that initially enters the first reactor is fed to the second reactor and then to the third reactor,
wherein feedstock flow that initially enters the second reactor is fed to the third reactor and then to the first reactor, and
wherein feedstock flow that initially enters the third reactor is fed to the first reactor and then to the second reactor;
thereby mimicking a simulated moving bed reactor.

2. The system of claim 1, wherein a direction of the feedstock flow in the cyclically arranged chemical-looping reactors is reversible.

3. The system of claim 2, wherein the plurality of chemical-looping reactors are effective in achieving at least one of carbon capture, fuel conversion, power plant safety and oxygen carrier stability.

4. The system of claim 1, wherein the plurality of chemical-looping reactors are fixed bed reactors that operate in a continuous operation using gaseous fuels for the purpose of power generation through integration with a combined cycle power plant.

5. The system of claim 4, wherein the fixed bed reactors operate in a semi-batch mode composed of reactor modules that are integrated into module trains that comprise a chemical-looping combustion island of the power plant.

6. The system of claim 1, wherein scheduling of the feedstock flow to the first reactor, the second reactor and the third reactor is cast as an optimization problem that maximizes thermodynamic efficiency subject to constraints imposed on each reactor and the plurality of chemical-looping reactors.

7. The system of claim 1, wherein processing of the feedstock flow employs distributed and modular chemical manufacturing options.

8. The system of claim 7, wherein the processing is effective in synthesizing transportable ammonia from stranded natural gas.

9. The system of claim 8, wherein the ammonia synthesis leverages chemical loops of at least one of metal imides and metal nitrides.

10. A method for chemical-loop reactor-based processing, comprising:
providing a plurality of chemical-looping reactors that includes at least a first reactor, a second reactor and a third reactor arranged cyclically,
cyclically feeding a feedstock flow to the first reactor, the second reactor and the third reactor, wherein the feedstock flow is initially fed to the inlet of the first reactor, then feedstock is fed to the second reactor and then feedstock is fed to the third reactor,
wherein feedstock flow that initially enters the first reactor is fed to the second reactor and then to the third reactor,
wherein feedstock flow that initially enters the second reactor is fed to the third reactor and then to the first reactor, and
wherein feedstock flow that initially enters the third reactor is fed to the first reactor and then to the second reactor;
thereby mimicking a simulated moving bed reactor.

11. The method of claim 10, further comprising reversing the direction of the feedstock flow in the cyclically arranged chemical-looping reactors.

12. The method of claim 10, wherein the chemical-loop reactor-based processing is effective for at least one of carbon capture, fuel conversion, power plant safety and oxygen carrier stability.

13. The method of claim 10, further comprising optimization of the chemical-loop reactor-based processing based on a calculation of energy efficiency in heat removal from the chemical-loop reactor-based processing according to the following formula:

$$\eta_{HR} = \frac{\int_{t_0}^{\tau_{hr}} (\dot{m}_{out}(t) h_{out}(t)) dt}{\int_{t_0}^{\tau_{cycle}} (\dot{m}_{out}(t) h_{out}(t)) dt}$$

where $T_{out}$, $\dot{m}_{out}$, $h_{out}$ are temperature, mass flow rate, and enthalpy of an exhaust stream associated with the chemical-loop reactor-based processing, where $\tau_{hr}$ is time duration of a heat removal stage, and where $\tau_{cycle}$ is a time interval for a complete redox cycle of the chemical-loop reactor-based processing.

14. The method of claim 10, further comprising scheduling of the chemical-loop reactor-based processing to establish process variables and time intervals for operation of each reactor to optimize energy efficiency.

* * * * *